United States Patent
Hull et al.

(10) Patent No.: US 11,326,733 B2
(45) Date of Patent: May 10, 2022

(54) ADA-COMPLIANT PIPE-INSULATING SLEEVES

(71) Applicant: OATEY CO., Cleveland, OH (US)

(72) Inventors: Eric Hull, Avon Lake, OH (US); Joshua Funk, Strongsville, OH (US); Willie Perez, Hudson, OH (US)

(73) Assignee: OATEY CO., Cleveland, OH (US)

( * ) Notice: Subject to any disclaimer, the term of this patent is extended or adjusted under 35 U.S.C. 154(b) by 0 days.

(21) Appl. No.: 16/348,283

(22) PCT Filed: Nov. 7, 2017

(86) PCT No.: PCT/US2017/060395
§ 371 (c)(1),
(2) Date: May 8, 2019

(87) PCT Pub. No.: WO2018/089363
PCT Pub. Date: May 17, 2018

(65) Prior Publication Data
US 2019/0264861 A1   Aug. 29, 2019

Related U.S. Application Data

(60) Provisional application No. 62/419,006, filed on Nov. 8, 2016.

(51) Int. Cl.
| | |
|---|---|
| *F16L 59/16* | (2006.01) |
| *E03C 1/04* | (2006.01) |
| *E03C 1/182* | (2006.01) |
| *F16L 9/22* | (2006.01) |
| *F16L 59/18* | (2006.01) |
| *F16L 59/22* | (2006.01) |

(Continued)

(52) U.S. Cl.
CPC ............... *F16L 59/16* (2013.01); *E03C 1/04* (2013.01); *E03C 1/182* (2013.01); *F16L 9/22* (2013.01); *F16L 59/023* (2013.01); *F16L 59/18* (2013.01); *F16L 59/22* (2013.01); *E03C 2001/321* (2013.01)

(58) Field of Classification Search
CPC ......... F16L 59/023; F16L 59/16; F16L 59/18; F16L 59/22; F16L 37/004
USPC .......................... 137/375; 138/156, 157, 158
See application file for complete search history.

(56) References Cited

U.S. PATENT DOCUMENTS

| | | |
|---|---|---|
| 3,191,632 A | 6/1965 | Keiding |
| 4,514,241 A | 4/1985 | Maukola |

(Continued)

*Primary Examiner* — Paul J Gray
(74) *Attorney, Agent, or Firm* — BakerHostetler

(57) ABSTRACT

A system of pipe insulating sleeves includes a series of elastomeric foam insulating sleeves that are capable of opening up to, and beyond, 180 degrees, to accommodate and capture an undersink pipe. The disclosed system may include a number of different sleeves that are capable of coupling to one another at respective couplers so as to form the system. The sleeves may include fastening mechanisms to retain the sleeves in the closed configuration while capturing the pipe, so as to create a smooth, streamlined appearance that is aesthetically pleasing. Also disclosed is a method of installing the sleeves. The sleeves are made of an elastomeric foam material that has heat insulating properties, and which may also have antibacterial and antimicrobial properties that make it particularly advantageous for use in undersink pipe insulating.

20 Claims, 15 Drawing Sheets

(51) Int. Cl.
*F16L 59/02* (2006.01)
*E03C 1/32* (2006.01)

(56) References Cited

U.S. PATENT DOCUMENTS

| | | |
|---|---|---|
| 4,807,669 A | 2/1989 | Prestidge, Sr. |
| 5,006,185 A | 4/1991 | Anthony et al. |
| 5,341,830 A | 8/1994 | Helmsderfer et al. |
| 5,348,044 A * | 9/1994 | Eugene .................. F16L 35/00 |
| | | 137/312 |
| 5,701,929 A | 12/1997 | Helmsderfer |
| 6,012,480 A | 1/2000 | Helmsderfer |
| 6,488,998 B1 * | 12/2002 | Crook .................... A01N 25/34 |
| | | 138/141 |
| 6,634,390 B2 | 10/2003 | Toth |
| D489,435 S | 5/2004 | Trueb et al. |
| 6,739,353 B2 | 5/2004 | Lechuga |
| 7,100,633 B2 | 9/2006 | Lechuga |
| 7,464,728 B2 | 12/2008 | Cairns |
| 7,749,923 B2 | 7/2010 | Moore et al. |
| D653,311 S | 1/2012 | Lechuga |
| 8,506,735 B2 | 8/2013 | Whitaker et al. |
| 2002/0108663 A1 | 8/2002 | Lechuga |
| 2004/0211467 A1 | 10/2004 | Lechuga |
| 2011/0084474 A1 * | 4/2011 | Paden .................... F16L 37/004 |
| | | 285/9.1 |
| 2015/0260329 A1 | 9/2015 | Bond et al. |
| 2016/0161043 A1 | 6/2016 | Bhatta et al. |

* cited by examiner

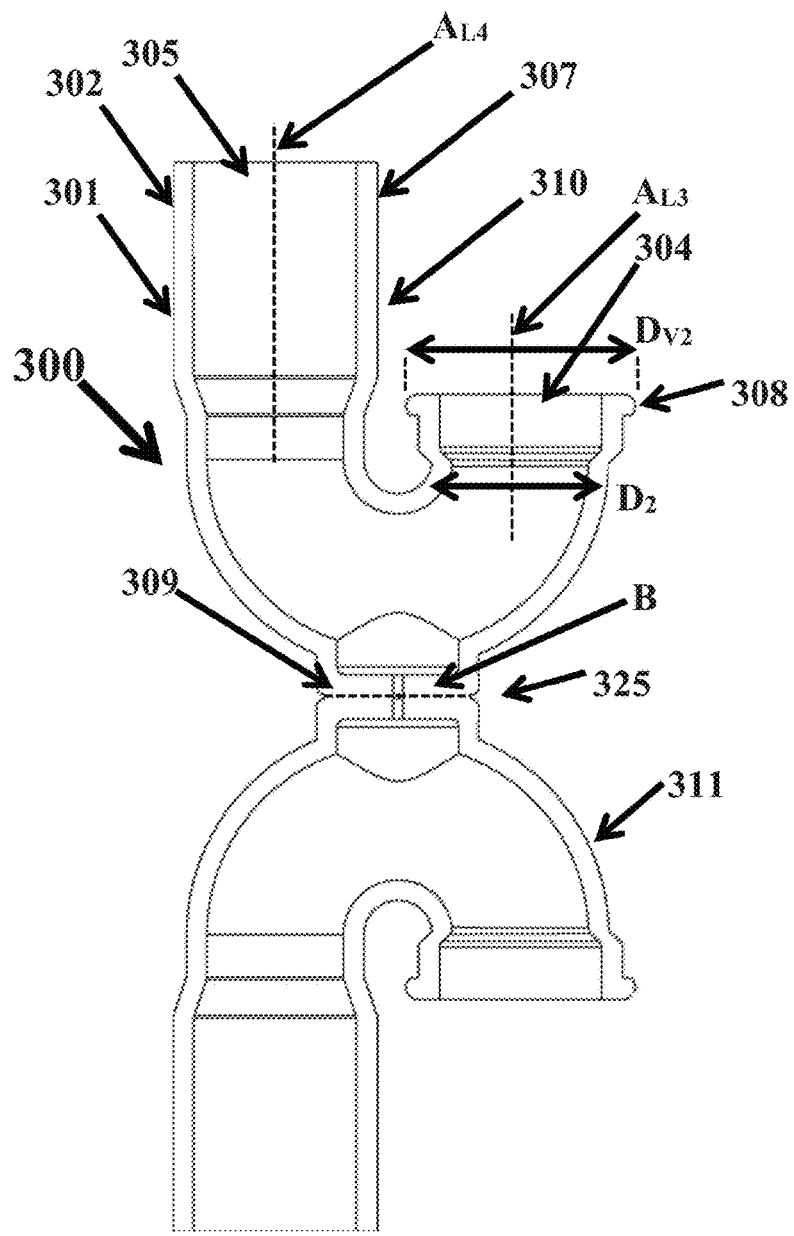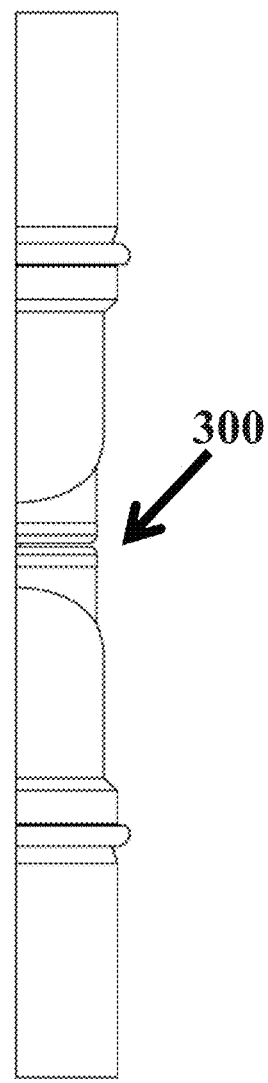
Figure 4C
Figure 4D

ADA-COMPLIANT PIPE-INSULATING SLEEVES

CROSS-REFERENCE TO RELATED APPLICATIONS

The present application is the National Stage Application of International Patent Application No. PCT/US2017/060395 filed Nov. 7, 2017, which claims priority to U.S. Provisional Application No. 62/419,006, filed Nov. 8, 2016. The contents of that application are incorporated herein by reference.

TECHNICAL FIELD

The present disclosure relates to pipe-insulating sleeves for surrounding, encasing, and thermally insulating pipes (e.g., undersink piping), such pipe-insulating sleeves being compliant with federal and state regulations, most notably the Americans with Disabilities Act ("ADA"), regarding the same.

BACKGROUND

It is well known that water that drains away from a sink or basin, such as a restroom sink, will travel though a drain opening of the sink and empty out into undersink piping. The undersink piping will direct water away from the sink and into the building's waste water system. The undersink drain piping is commonly referred to as a "P-trap" drain assembly, and "P-trap" assemblies are common to many sinks in both commercial and residential applications.

P-trap assemblies, generally, include a vertical pipe section which extends downwardly from the sink drain opening and below the sink to couple with a J-shaped pipe section. The J-shaped pipe section makes a 180° bend and then extends vertically upward to couple with an L-shaped pipe section which itself makes a 90° bend from the J-shaped section to extend generally horizontally into the wall so as to connect the P-trap with the waste water system of the building. The P-trap creates a vapor barrier vis-à-vis a residual level of standing water, thereby preventing undesirable vapors from passing back into the building through the drain piping. The J-shaped section also serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber.

Also extending below the sinks are separately formed hot and cold water supply pipes, commonly referred to as supply water angle valves, which include supply line sections which extend generally horizontally from the wall to connect to a respective valve and faucet line section that extends generally vertically upward from each valve to connect to the sink faucet apparatus.

Building regulations require that restroom facilities in a public building, such as restroom sinks, be accessible to all people, including disabled persons and particularly those disabled persons who must use a wheelchair. Persons in wheelchairs must usually maneuver the chair partially under a restroom sink to access it. Since the water supply pipes and P-trap drain pipes protrude from the wall and are exposed underneath the sink, there is a risk of abrasions to the person's legs from the hard piping or even burns from the temperature of the piping caused by heat transferred to the metal pipes from the water passing therethrough. Current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to cover and insulate undersink P-traps and water supply piping.

In the past, one of the more popular (and rudimentary) methods of insulation was to utilize loose foam insulation that was wrapped around the piping. However, traditional foam insulation fits poorly and is difficult to secure, resulting in wasted time and wasted money by the plumber, installer, or building owner. Furthermore, the foam wrap, due to its poor fit and inadequate securing means, is not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. While many such devices purport to adequately insulate the pipes, they have many drawbacks. For example many of these other devices and methods are difficult and time-consuming to secure and use. Many of them provide a sleeve having an open slit along the length of a sleeve surface, which requires that a user physically expand and otherwise forcefully manipulate the sleeve to receive and secure the pipe. A further and more significant deficiency is encountered during removal of the sleeves, wherein a user will need to forcefully separate the slitted sleeves from the pipe while having reduced gripping area on the sleeve due to the presence of the pipe within the cavity of the sleeve.

A further disadvantage of many existing devices is that they fail to adequately reduce or eliminate the buildup of mold and bacteria on the sleeves themselves and in/around the insulated pipes. Sleeves that insulate undersink piping are especially prone to the buildup of mold or bacteria due to the presence and unintended collection of moisture. Moisture may accumulate around the pipes and within the insulating sleeves by virtue of small leaks in the pipes or connecting valves, or from the pipes "sweating," a phenomenon that occurs when a cold pipe comes into contact with warmer and/or humid ambient air. In any case, the moisture accumulation, if not abated, can result in the growth of bacteria or mold. Such bacteria and mold can pose a significant health or sanitation hazard if someone should come into direct contact (e.g., physically touching) or indirect contact (e.g., inhalation of airborne particles) with the same. Existing devices provide an anti-bacterial and/or anti-fungal coating on the surface of the insulating material; however this coating may wear away over time or become compromised due to trauma to the sleeves. When the coating of existing systems has become compromised, those compromised portions are greatly susceptible to the growth of bacteria and/or mold.

Therefore, there is a need for a pipe insulating system for insulating undersink piping in compliance with federal and state regulations that 1) is easy to install and remove, 2) prevents the formation and buildup of bacteria and mold, and 3) is aesthetically pleasing and low cost.

The present invention provides a system of sleeves for insulating undersink piping in compliance with the required standards and regulations. The sleeves of the present invention are configured to be easily installed and removed from the pipes due to a hinged design along an outer periphery of each of the sleeves. The hinged design divides each sleeve into two complementarily-shaped halves that may be rotated, via the hinge, with respect to one another. The degree of rotation may be up to and beyond 180 degrees. Another aspect of the present invention is that the sleeves are constructed of an elastomeric foam material, preferably ethylene-vinyl acetate (EVA) foam material, wherein the foam is specially formulated to contain anti-fungal and/or anti-bacterial components. Further, the present invention provides a system of sleeves for insulating undersink piping that is thin, low profile, aesthetically pleasing, and relatively low cost compared to existing systems on the market.

SUMMARY OF THE INVENTION

A system of insulating pipes according to a first embodiment of the invention includes a first sleeve defining a hollow first body that extends along a first axis of elongation from a first end to a second end. The first body has a first rounded outer surface and an opposed first inner surface. The first body includes a first hinge that extends along a portion of the first outer surface of the first body, where the first hinge bifurcates the first body into a first half and a second half. The first half of the first body defines first and second edges that are substantially planar and the second half of the first body defines third and fourth edges that are substantially planar. The first and third edges are connected by the first hinge and define a first angle therebetween. The first and second halves of the first body are rotatable relative to one another about a first rotation axis defined by the first hinge, such that the first sleeve defines both a closed configuration and a partially open configuration. The closed configuration is characterized by the second and fourth edges abutting one another. The partially open configuration is characterized by the second and fourth edges not abutting one another and the first angle being between 0° and 180°.

In another aspect, the system may further include a second sleeve that is configured to removably connect to the first sleeve. The second sleeve defines a hollow second body that extends along a second axis of elongation from a third end to a fourth end. The second body has a second outer surface and an opposed second inner surface, and the third end defines a third opening and the fourth end defining a fourth opening. The second body includes a second hinge that extends along a portion of the second outer surface at the fourth end, where the second hinge bifurcates the second body into a first half and a second half. The first half of the second body defines fifth and sixth edges that are substantially planar and the second half of the second body defines seventh and eighth edges that are substantially planar. The fifth and seventh edges of the second body are connected by the second hinge and define second angle therebetween. The first and second halves of the second body are rotatable relative to one another about a first rotation axis defined by the first hinge, such that the second sleeve defines both a closed configuration and a partially open configuration. The closed configuration is characterized by the sixth and eighth edges abutting one another. The partially open configuration is characterized by the sixth and eighth edges not abutting one another and the second angle being between 0° and 180°.

A method of installing a pipe insulating sleeve system on an undersink pipe may be performed in a series of steps. A user may begin by identifying an undersink pipe to be insulated by a pipe insulating sleeve. The method may continue by selecting a pipe insulating sleeve that is sized and configured to be installed on the identified undersink pipe, where the pipe insulating sleeve is generally elongate along a first axis. The method may further include opening the pipe insulating sleeve by rotating a first half of a body of the pipe insulating sleeve relative to a second half of the body about a second axis defined by a hinged joint that bifurcates the first half from the second half. Opening the pipe insulating sleeve creates a gap at an outer edge of the pipe insulating sleeve on the opposite side of first axis from the hinged joint. The gap may be thought of as a function of a degree of rotation between the first and second halves of the body of the pipe insulating sleeve, and wherein the degree of rotation is configured to exceed 180°. The method may further include retaining the identified undersink pipe within a hollow interior portion of the pipe insulating sleeve by moving the sleeve toward the identified pipe along a direction generally perpendicular to the first axis of the pipe insulating sleeve and inserting the identified undersink pipe through the gap. The method may further include closing the pipe insulating sleeve by rotating the first half relative to the second half in the opposite direction as in the opening step so as to capture the identified undersink pipe within the pipe insulating sleeve.

In another aspect, the gap is further defined by first and second opposing edges and the closing step of the method may further comprise engaging a set of complementary fastening mechanisms disposed on the first and second edges. The fastening mechanisms will permit the undersink pipe to be additionally retained within the hollow interior of the pipe insulating sleeve. In a further aspect, the method may also include the step of removing the pipe insulating sleeve from the undersink pipe by rotating the first half of the pipe insulating sleeve body relative to the second half along the same direction of rotation as in the opening step. The removing step is ordinarily performed with sufficient force to cause the fastening mechanisms to break a seal formed between the fastening mechanisms and so as to form a gap sufficiently large so as to pass the desired undersink pipe outwardly from the hollow interior portion of the pipe insulating sleeve.

In still further aspects, the method may additional include installing an additional pipe insulating sleeve on a different undersink pipe than the identified undersink pipe, whereby the additional pipe insulating sleeve is installed adjacent to the pipe insulating sleeve. The method may further include coupling the additional pipe insulating sleeve to the pipe insulating sleeve by mating a coupler of the additional pipe insulating sleeve with a complementary coupler of the additional pipe insulating sleeve so as to create a seal therebetween the coupled pipe insulating sleeves.

BRIEF DESCRIPTION OF THE DRAWINGS

FIG. 4C is a front plan view of the J-shaped pipe insulating sleeve as shown in FIG. 4B;

FIG. 4D is a side plan view of the J-shaped pipe insulating sleeve as shown in FIG. 4C;

DETAILED DESCRIPTION OF THE DRAWINGS

The pipe insulation system of the present invention, as shown and described herein, may comprise a series of pipe insulating sleeves for covering typical undersink piping. It is contemplated that the present pipe insulating system will be utilized for commercial undersink piping, as this is the piping with which users may come into the most contact during operation of the sink, including most notably individuals in wheelchairs whose legs will extend beneath the sink. Such usage will comply with requirements and standards as promulgated under the ADA. It is further contemplated, however, that the pipe insulation system may be used to cover any piping, regardless of location or the fluid contained therein, where insulation may be needed or desired. Such usage will advantageously provide thermal insulation to the fluid being transported through the piping by preventing internal heat from transferring into the ambient environment. Such use may reduce aggregate energy costs for building owners by reducing heat loss and thereby reducing the energy needed to heat or cool fluid transported through supply lines. Additional aspects of these other applications may provide protection to temperature or moisture-sensitive equipment or the like immediately adjacent the piping, which would otherwise be adversely affected by heat propagating from the pipe, but for the insulation provided by the sleeves. Other benefits and uses of the invention will become apparent to one of skill in the art in view of the foregoing detailed description.

In any case, it will be understood that although the pipe insulating sleeves of the presently disclosed invention may be molded into any shape or configuration (as described in greater detail below with respect to the material and formulation of the same), the detailed description that follows will describe primarily a series of sleeves that cooperate to insulate undersink piping. However, it will be understood that such application is non-limiting.

Figure 1:
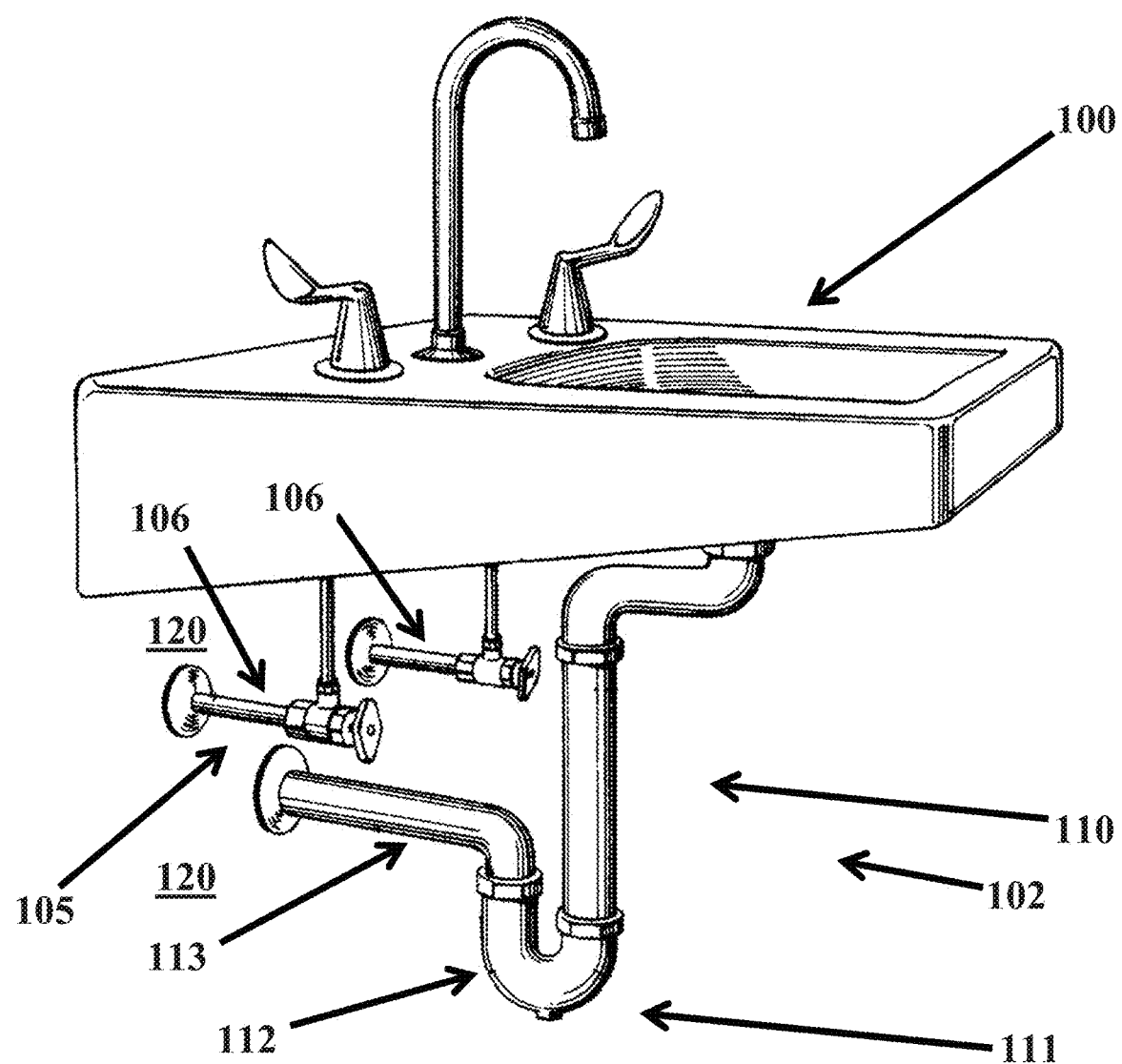
FIG. 1 is a typical commercial sink with exposed undersink piping.
Figure 2A:
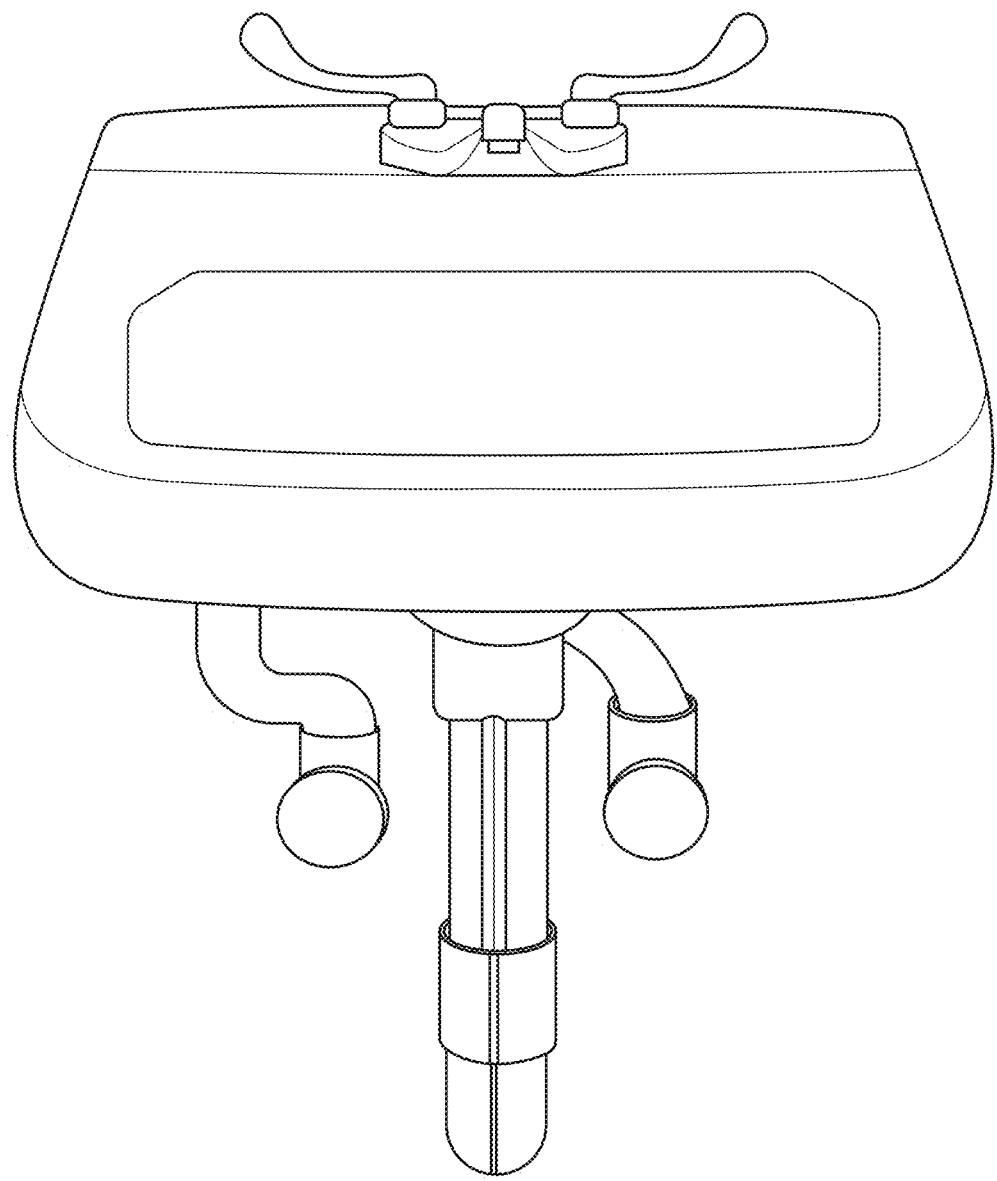
FIG. 2A is a front perspective view of a system of pipe-insulating sleeves, according to a first embodiment of the invention, the sleeves as shown being installed beneath a sink.
Figure 2B:
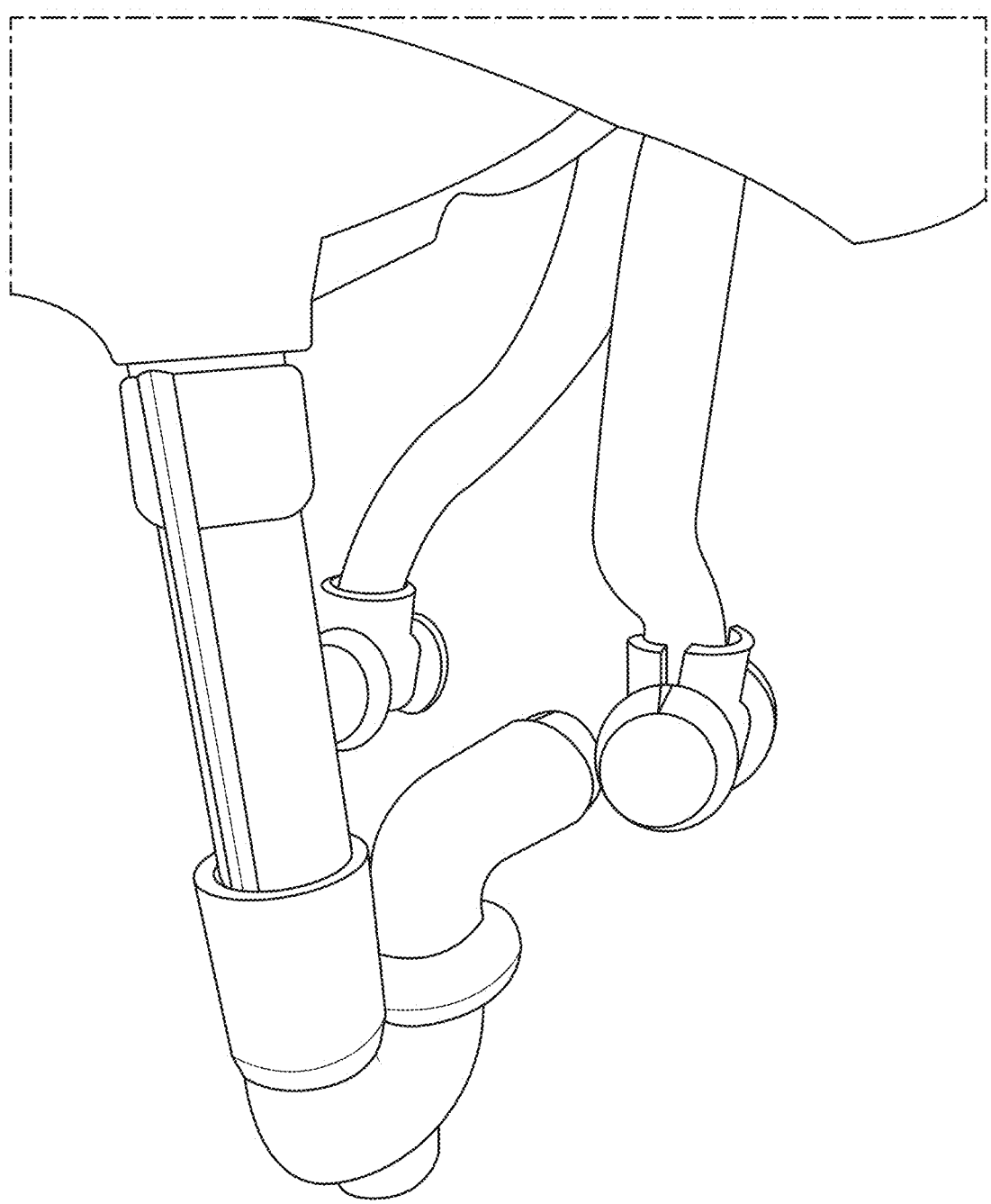
FIG. 2B is a perspective view of the system of pipe-insulating sleeves as shown in FIG. 2A.
Figure 2C:
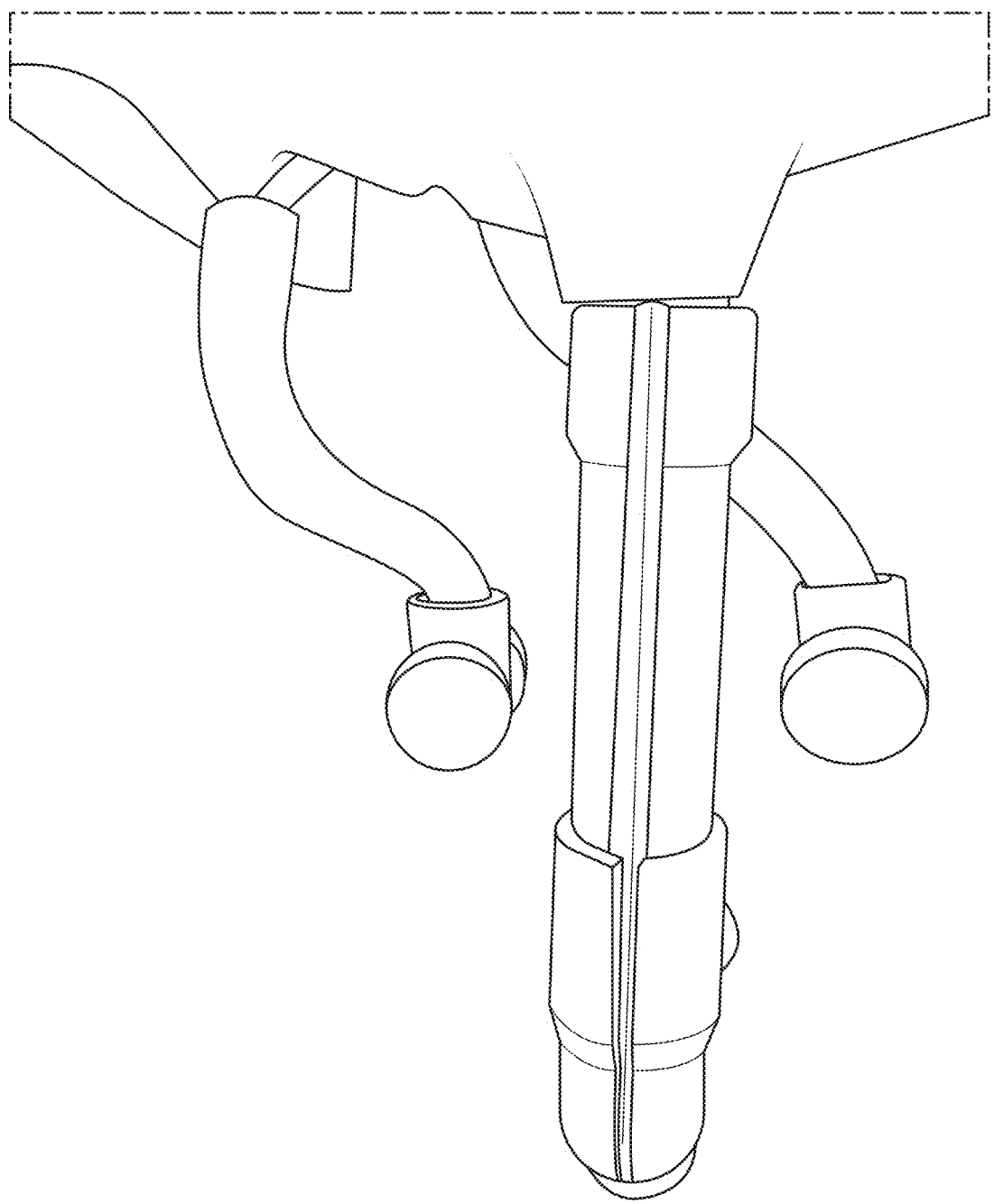
FIG. 2C is a front zoomed view of the system of pipe-insulating sleeves as shown in FIG. 2A.
Figure 2D:
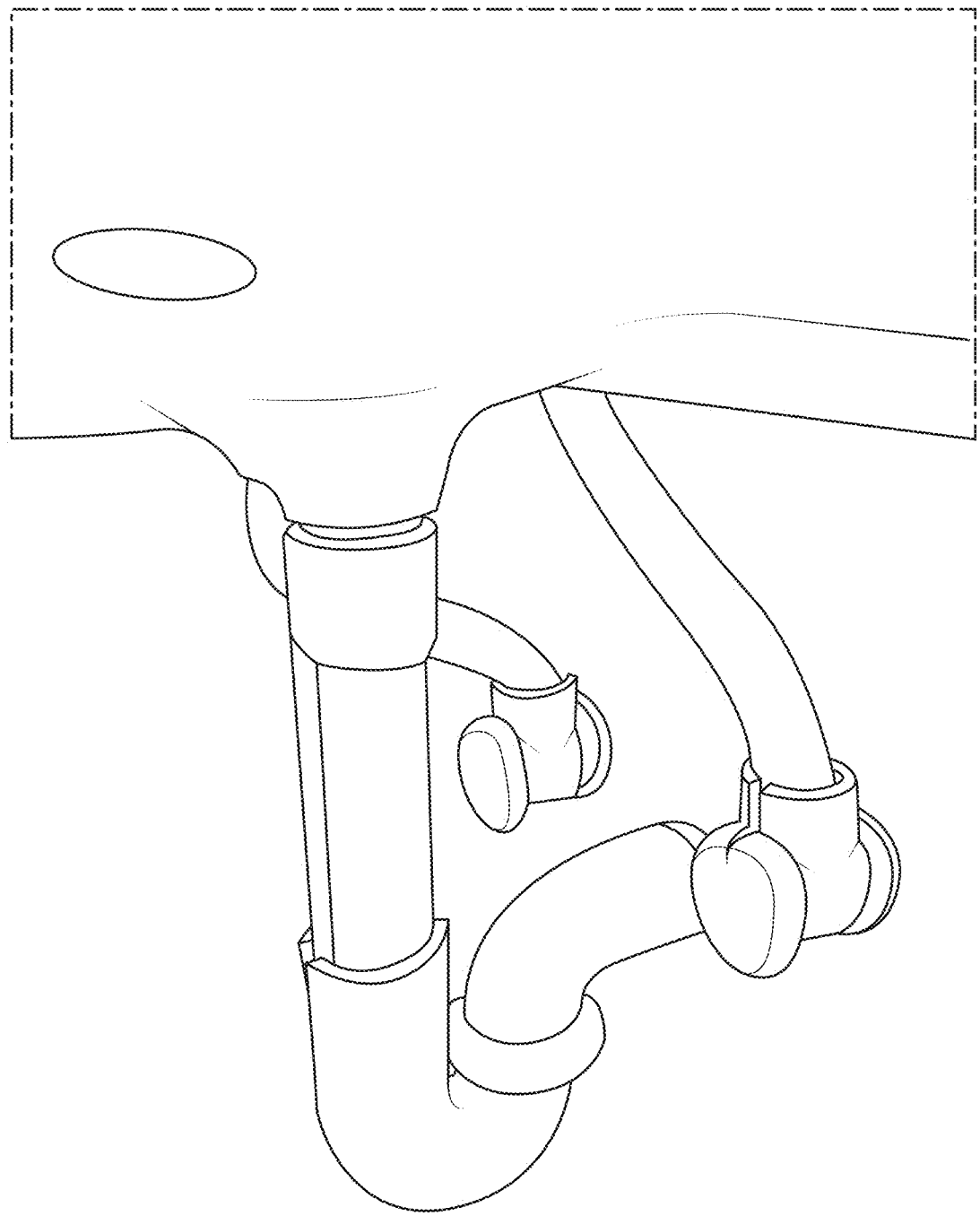
FIG. 2D is a side perspective view of the system of pipe-insulating sleeves as shown in FIG. 2A.

FIG. 1 illustrates a typical commercial sink (100) with exposed undersink piping (102), as it would typically be found in a commercial or public restroom. As shown in the Figure, the undersink piping (102) may generally be divided into two distinct sets: the drain piping (110) and the water supply piping (105). The drain piping (110), which comprises a P-trap (111), extends from the drain in the sink (not depicted) and terminates in the wall (120), wherein it generally joins with a wastewater system of the building (not depicted). As illustrated in FIG. 1, the P-trap (111) generally includes a vertical pipe section (110) which extends downwardly from the drain in the sink and extends below the sink to couple with a J-shaped pipe section (112). The J-shaped pipe section (112) makes a 180° bend and then extends vertically upward to couple with an L-shaped pipe section (113), which itself makes a 90° bend from the J-shaped section (112) to extend generally horizontally into the wall (120). The water supply piping (105) comprises two supply lines (106), commonly referred to as supply water angle valves, which separately supply both hot and cold water to the sink (100). As illustrated in FIG. 1, the supply lines (106) extend generally horizontally from the wall (120) to connect to a respective valve and faucet line section (107) that extends generally vertically upward from each valve (or supply stop) (108) to connect to the faucet apparatus (101) of the sink (100).

Unlike existing pipe sleeve systems, the pipe insulating sleeves of the present invention are generally characterized by a hinged design (also known as a "butterfly" design) that enables them to be hingedly opened so as to easily and conveniently accommodate a desired pipe section therein. The hinged design comprises a hinged joint on an outer portion of the sleeve. The hinged joint bifurcates each of the sleeves into two generally symmetrical halves which may rotate relative to one another about an axis defined by the hinged joint. The two halves may selectively rotate so as to define 1) a closed configuration, where the halves have not been rotated relative to one another about the hinged joint, 2) a partially open configuration, where the halves define a rotation therebetween of up to 180 degrees, and 3) a fully open configuration where the halves define a rotation therebetween of 180 degrees or greater. Opposite the hinged joint on the sleeves is an open (or separated) end, where each of the sleeve halves may touch one another when in the closed configuration. The pipe sleeves of the present invention are configured to laterally receive the undersink pipe sections along a direction transverse to the pipe's axis of elongation. However, it is contemplated that the pipe sleeves may receive the pipes longitudinally along the pipe length by sliding the sleeve along the length of pipe—although one of skill in the art will appreciate that such applications may be limited to adjustment of the pipe sleeves along the pipe, as well as to inserting pipe sleeves onto an open end of a pipe or a valve.

It should be noted that the halves, although generally symmetrical are not identical, mirror images of one another. As but one example, and as will be described in greater detail below, each sleeve half will differ from the other half connected at the hinged joint by virtue of complementary fastening mechanisms carried by the respective halves. The complementary fastening mechanisms are configured to interact with one another so as to releasably fix the sleeve's halves in the closed configuration.

Advantageously, and by virtue of the hinged joint, the two halves may rotate relative to one another within the partially open configuration up to the fully open configuration so as to easily and conveniently receive a portion of the undersink pipe section within the sleeve. Because there is no biasing force at the hinged joint that urges the sleeves into the closed configuration, a user can easily adjust the degree of angulation of the sleeve halves using a single hand so as to 1) easily receive the pipe section within the sleeve, and 2) capture and retain the pipe utilizing the fastening mechanisms described in greater detail below with respect to each sleeve. It will be understood that the sleeves of the present invention need not define the fully open configuration in order to receive the pipe section therein, and that a sufficient degree of angulation between the two halves in the partially open configuration will adequately receive and capture the pipe.

Thus, and as explained in greater detail below with respect to a method of installing the present system, the hinged design represents an improvement in the art over the "slitted" design of sleeve systems presently available on the market. The slitted designs are characterized by a single slit along the length of an outer portion of a tubular sleeve, such that when a user wishes to install the sleeve on a particular pipe, the user must physically spread the sleeve open in order to pass the pipe through the gap created by the separation and into the hollow interior of the sleeve. This slitted design can complicate installation of the sleeves, and furthermore, it makes removal of the sleeves much more troublesome. By using the hinged, butterfly design to selectively open and close the pipe insulating sleeves of the present invention, the installation and removal method presents an improvement over existing sleeves utilizing a slitted design, or the like.

FIGS. 2A-2D depict a system of pipe-insulating sleeves, according to a first embodiment of the invention. As shown in the Figures, the pipe insulating sleeves cooperate with one another in series to define the system. As will be described in further detail below, the various sleeve sections may selectively overlap, capture, or interact with one another so as to cooperatively and removably be joined to one another in series. The system of pipe insulating sleeves are designed to have a smooth, streamlined, and aesthetically pleasing appearance, and the connective joints between the various connecting individual pipe sleeves are designed to minimize heat loss so as to maintain the heat insulating integrity of the system. As shown in the various FIGS. 2A-2D, the system includes both drain sleeves and supply sleeves.

Figure 3A:
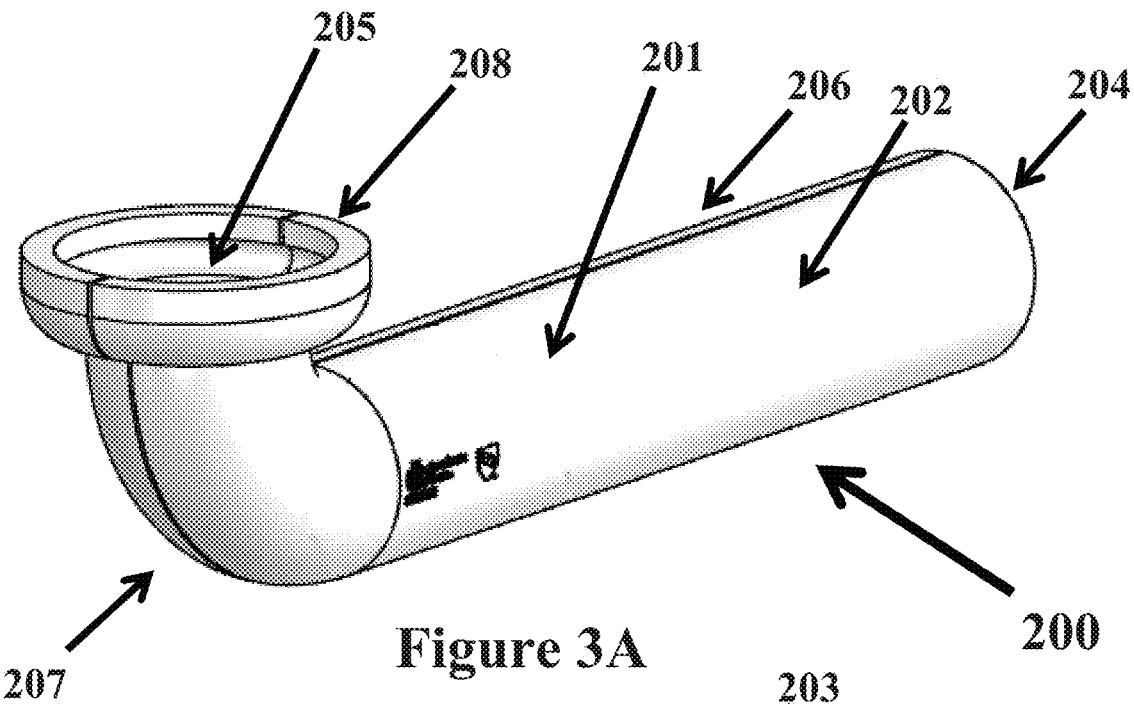
FIG. 3A is a perspective view of an L-shaped pipe insulating sleeve according to a first embodiment of the invention, wherein the sleeve is in a closed configuration.
Figure 3B:
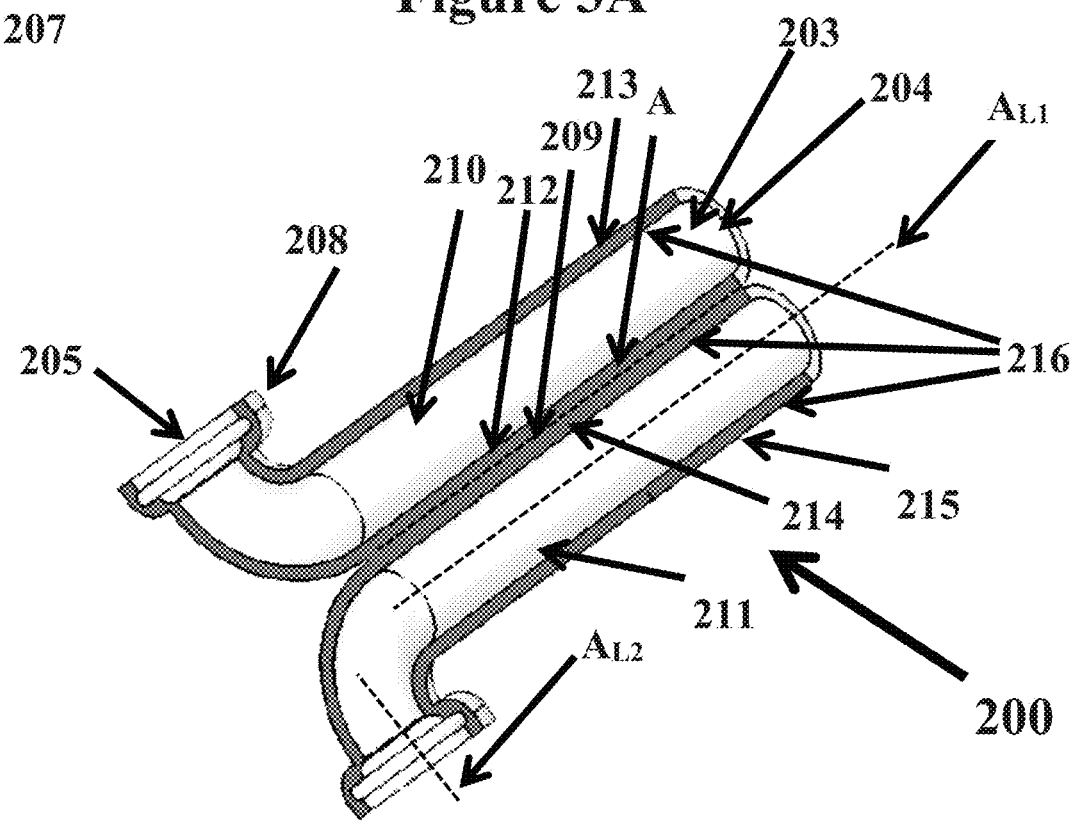
FIG. 3B is a perspective view of the L-shaped pipe insulating sleeve as shown in FIG. 3A, wherein the sleeve is in an open configuration.
Figure 3C:
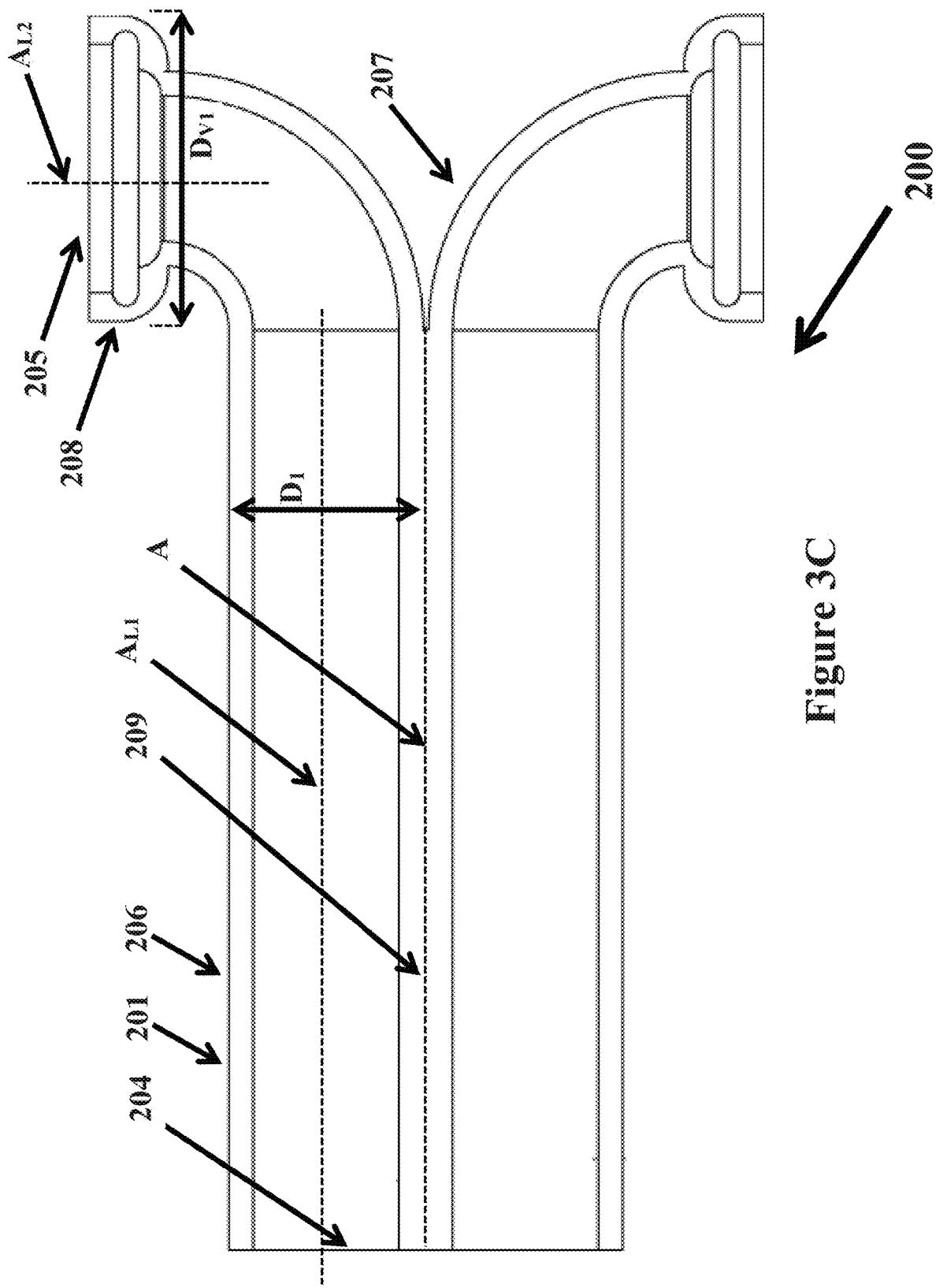
FIG. 3C is front-plan view of the L-shaped pipe insulating sleeve as shown in FIG. 3B.

FIGS. 3A-3C depict an L-shaped pipe insulating sleeve ("L-sleeve") (200) according to a first embodiment of the invention. The L-sleeve (200) is sized and configured to accommodate the L-shaped pipe section from the P-trap (see FIG. 1) within a hollow interior portion of the L-sleeve (200). Accordingly, the L-sleeve (200) in an installed configuration will encase the L-shaped pipe section along a substantial entirety of its length along an axis of elongation. Although an L-sleeve (200) is shown in FIGS. 3A-3C for illustrative purposes, one of ordinary skill in the art will readily understand that the L-sleeve (200) could alternatively assume any shape necessary to accommodate an undersink pipe needing to be insulated. In that respect, aside from the shape of the pipe itself, such alternatively-shaped pipe would otherwise have the same features as the L-sleeve (200) as described herein.

With reference to FIG. 3A, which depicts a perspective view of the L-sleeve (200) in the closed configuration, the L-sleeve (200) generally defines a hollow tubular body (201) having a tubular (or rounded) outer surface (202) and an opposed interior surface (203) that is defined by the hollow interior portion. Similar to the L-shaped pipe section (113) received within the hollow interior portion of the L-sleeve (200), the tubular body of the L-sleeve (200) forms a shape similar to an elongated letter "L." The body (201) of the L-sleeve (200) extends substantially along a tubular axis of elongation from a first end to a second end. The first and second ends define respective first and second openings (204, 205) that are elongate about respective first and second axes ($A_{L1}$, $A_{L2}$), the openings being in open communication with the hollow interior portion of the sleeve. The first and second axes ($A_{L1}$, $A_{L2}$) are substantially perpendicular to one another.

With reference now to FIGS. 3A and 3B, the hollow tubular body (201) of the L-sleeve (200) includes a straight portion (206) and a bent portion (207). The straight portion (206) extends from the first opening (204) at the first end, up until the bent portion (207), and the bent portion (207) extends from the straight portion (206) up to the second opening (205) at the second end. Furthermore, the bent portion (207) of the tubular body (201) adjacent the second end defines a first coupler (208), the first coupler (208) being characterized by a radially expanded (with respect to the second axis ($A_{L2}$)) or widened portion. As illustrated particularly in FIG. 3C, the straight portion (206) of the tubular body (201), as well as the bent portion (207) of the tubular body (201) near the straight portion (206), has a substantially uniform diameter $D_1$ along its length. The first coupler has an expanded, variable diameter $D_{V1}$ along its length that is greater than $D_1$. As will be described in greater detail below, the first coupler (208) is sized and configured to mate with a complementary coupler mechanism on another pipe insulating sleeve of the present invention so as to detachably couple the L-sleeve (200) to another sleeve.

With continuing reference to FIGS. 3B and 3C, the tubular body (201) of the L-sleeve (200) includes a first hinged joint (209) adjacent the tubular outer surface (202) at the straight portion (206). The first hinged joint (209) bifurcates the tubular body (201) of the L-sleeve (200) into a first half (210) and a second half (211), the halves being hingedly connected at the first hinged joint (209) and rotatable relative to one another about an axis (A) defined by the first hinged joint (209).

The first half (210) defines first and second edges (212, 213) that are substantially planar with one another, the first and second edges (212, 213) each extending substantially perpendicular to the first axis ($A_{L1}$), where the first edge (212) extends from the first hinged joint (209) to the opposed interior surface (203), and where the second edge (213) extends from the tubular outer surface (202) to the opposed interior surface (203). The second half (211) defines third and fourth edges (214, 215) that are substantially planar with one another, the third and fourth edges (214, 215) each extending substantially perpendicular to the first axis ($A_{L1}$), where the third edge (214) extends from the first hinged joint (209) to the opposed interior surface (203), and where the fourth edge (215) extends from the tubular outer surface (202) to the opposed interior surface (203). The first and third edges (212, 214), which as noted above are connected to one another by the first hinged joint (209), define a first angle therebetween. It is noted that the second and fourth edges (213, 215) will abut one another only when the first and second halves (210, 211) of the tubular body (201) of the L-sleeve (200) are in the closed configuration.

The first half (210) and second half (211) are substantially symmetrical with one another about a plane intersecting the first hinged joint (209) and intersecting the first and second axes ($A_{L1}$, $A_{L2}$) when the L-sleeve (200) is in the closed configuration. The first and second halves (210, 211) are distinguishable, however, in that they each carry a different set of complementary fastening mechanisms (216). As shown in FIG. 3B, the first and second halves may include complementary halves of a hook-and-loop fastening system, such as, for example Velcro® brand fasteners. When the first and second halves (210, 211) are fastened to one another by the fastening mechanisms (216), it will create a relatively streamlined, low-profile, and aesthetically appealing appearance of the outer surface (202) of the sleeve. It is understood that application of the fastening mechanism (216) when closing the L-sleeve (200) will provide an additional measure of retention to both keep the L-sleeve (200) closed and to further retain the pipe within the hollow interior of the L-sleeve (200). It is further understood that, in order to release the fastening mechanism (216), a user will need to apply sufficient force to separate the fastening mechanisms (216) and thereby open the L-sleeve (200) to adjust its positioning or to remove the pipe therefrom.

Figure 11A:
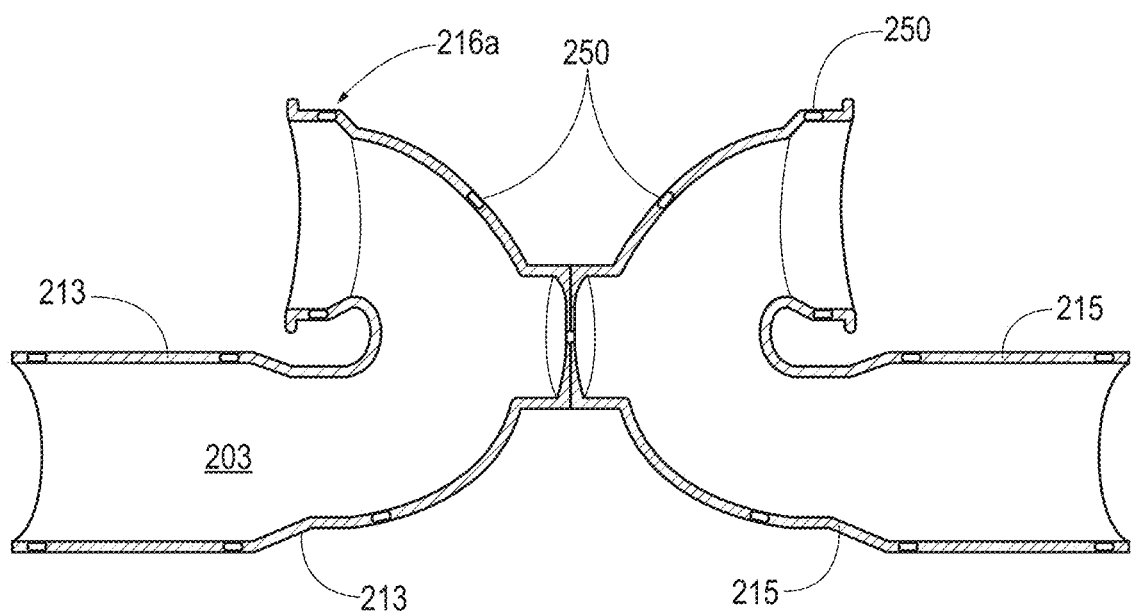
FIG. 11A is a perspective view of a pipe insulating sleeve according to another embodiment.
Figure 11B:
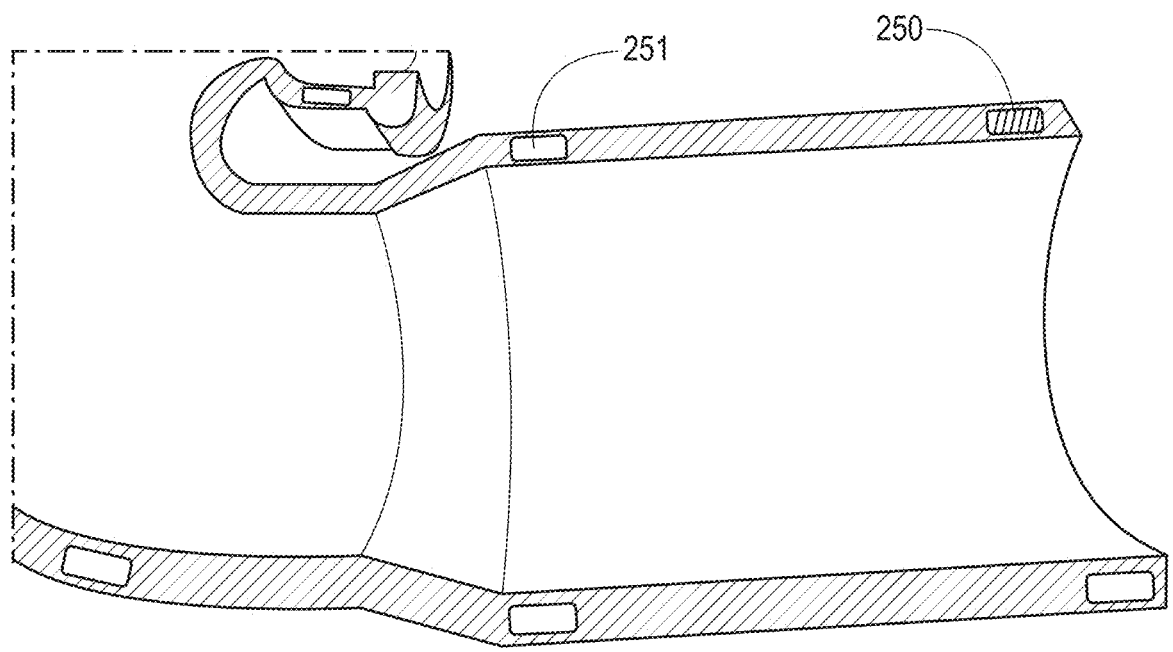
FIG. 11B is a zoomed, perspective view of the pipe insulating sleeve as shown in FIG. 11A.

Other fastening mechanisms (216) may be used. For example, as illustrated in FIGS. 11A-11B, magnetic closure devices (216a) may be substituted for the hook-and-loop design of the previously described embodiment. The magnetic closure devices (216a) further comprise an array of individual magnets (250), which may be installed within the second and fourth edges (213, 215) of the sleeve, where one edge will contain magnets (250) of opposite polarity from the magnets (250) of the opposing edge. As one of skill in the art will understand, magnets of opposite polarities (i.e., positive and negative charges) will attract one another. In some embodiments, the individual magnets (250) may be inserted into a completed pipe sleeve by removing small portions of material from the second and fourth edges (213, 215) to create pits (251, see FIG. 11B), inserting the magnets (250), and bonding them to the sleeve within the pits (251) by using an adhesive (such as polymer cement, glue, or the like). In other embodiments, the magnets may be inserted into a pipe sleeve injection mold such that the foam, once hardened in the mold, may be formed about the entirety of the magnet's outer surface. One of skill in the art will appreciate that after the completed sleeve with magnets (250) has hardened within the injection mold, refinement to the second and fourth edges (213, 215) so as to expose a surface of the magnets (250) at the respective edge's surface.

Regardless of the method of introducing the magnets (250) into the sleeve edges, the magnets (250), as illustrated, should fit entirely within the respective second and fourth edges (213, 215) such that no portion of the magnets (250) protrude outwardly into the inner or outer surfaces (203, 202) of the sleeve. Therefore, the magnets (250) should be sufficiently small in the direction of the sleeve's thickness (measured in a direction between the outer surface (202) and the opposing inner surface (203)) in order to recess entirely within the limited thickness of the sleeve. To compensate for this constraint, the magnets (250) may have an increased length and depth, respectively, in the two directions perpendicular to the thickness (i.e., and with reference to FIG. 11A, the directions running from Left to Right and In to Out of the plane of the figure) so as to maximize the total volume of the magnet (250). It is understood that the depth of any given magnet (250) may be limited, in part, by the curvature of the pipe sleeve. Because undersink pipes are typically 1.5 inches in diameter, a prismatic magnet (250) will have a limited depth, so as to avoid protruding from either one of the inner or outer surfaces (203, 202) of the sleeve. Length of the magnets (250) may typically be limited by the geometry of the pipe sleeve in question, wherein a long edge may accommodate a potentially longer magnet (250), while the opposite may be true of a shorter edge.

On a higher level, one of skill in the art will readily appreciate that magnetic field strength of a magnet is partly a function of the total volume of a magnetic material, so maximizing the volume of the magnets (250) is desirable. It is further desirable that the magnets (250) of the illustrated embodiment will have high magnetic field strength, characterized by a large magnetic flux distributed evenly across the exposed surface area of the magnets (250), shown in FIGS. 11A and 11B. The high magnetic flux will permit strong attractive forces between magnets (250) of opposite polarities, which will advantageously keep the sleeve in the closed configuration about the circumference of the pipe.

In the embodiment illustrated in FIG. 11A, a total of 8 magnetic closure devices (216a) have been fitted within each one of the first and second halves (210, 211). However, it is appreciated that other numbers of magnetic closure device (216a) may be utilized as needed, given such factors as the size of the sleeve, the strength of the selected magnets, and the desired spacing between the magnets. Insofar as spacing between the magnets is concerned, the magnets in the illustrated embodiment are spaced approximately 1-2 inches apart, as measured along the respective edge (213, 215) in which they are embedded. In general, the spacing between adjacent magnets, along the edge, should be adequate to permit ease of separation when a user desires to open the sleeve, for example during installation or removal from an underlying pipe. Accordingly, it may be desirable to have the magnets (250) spaced sufficiently from one another to permit a user's fingers to pass between the adjacent magnets so as to facilitate mechanical, hand-separation.

In still other embodiments, the fastening mechanisms (216) may comprise a plurality of external tabs that extend from the tubular outer surface near the first and second edges, while the second half includes a plurality of complementary slots that extend into the hollow tubular body from the tubular outer surface to the opposed interior surface. The plurality of tabs are configured to cooperate with the plurality of slots to fix the first and second halves in the closed configuration. Advantageously, when each of the plurality of tabs are fully received within the corresponding plurality of slots, the tubular outer surface maintains a fairly consistent circumference along the length of the L-sleeve, and the fully received, or inserted, tabs are substantially flush with the outer tubular surface of the pipe body. In other words, each of the plurality of tabs may be received in the corresponding plurality of slots such that the tubular outer surface maintains a consistent outer diameter as well as a streamlined, low-profile, and aesthetically appealing appearance.

FIGS. 4A-4D depict a J-shaped pipe insulating sleeve ("J-sleeve") (300) according to a first embodiment of the invention. The J-sleeve (300) is sized and configured to accommodate the J-shaped pipe section (112) from the P-trap (see FIG. 1) within a hollow interior portion of the J-sleeve (300). Thus, the J-sleeve (300) in an installed configuration will encase the J-shaped pipe section (112) along a substantial entirety of its length along a parabolic axis of elongation. Furthermore, the J-sleeve (300) is configured to be selectively securable to the L-sleeve (200) (described above). Although a J-sleeve (300) is shown in FIGS. 4A-4D for illustrative purposes, one of ordinary skill in the art will readily understand that the J-sleeve (300) could alternatively assume any shape necessary to accommodate an undersink pipe needing to be insulated. In that respect, aside from the shape of the pipe itself, such alternatively-shaped pipe would otherwise have the same features as the J-sleeve (300) as described herein, including the ability to couple to another pipe insulating sleeve connected in series, as will be described below.

Figure 4A:
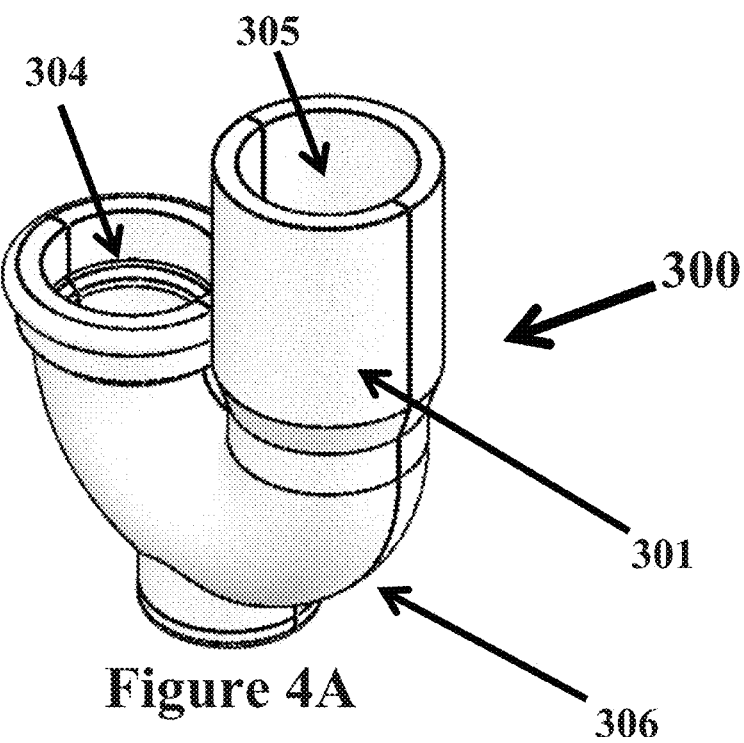
FIG. 4A is a perspective view of a J-shaped pipe insulating sleeve according to a first embodiment of the invention, wherein the sleeve is in a closed configuration.
Figure 4B:
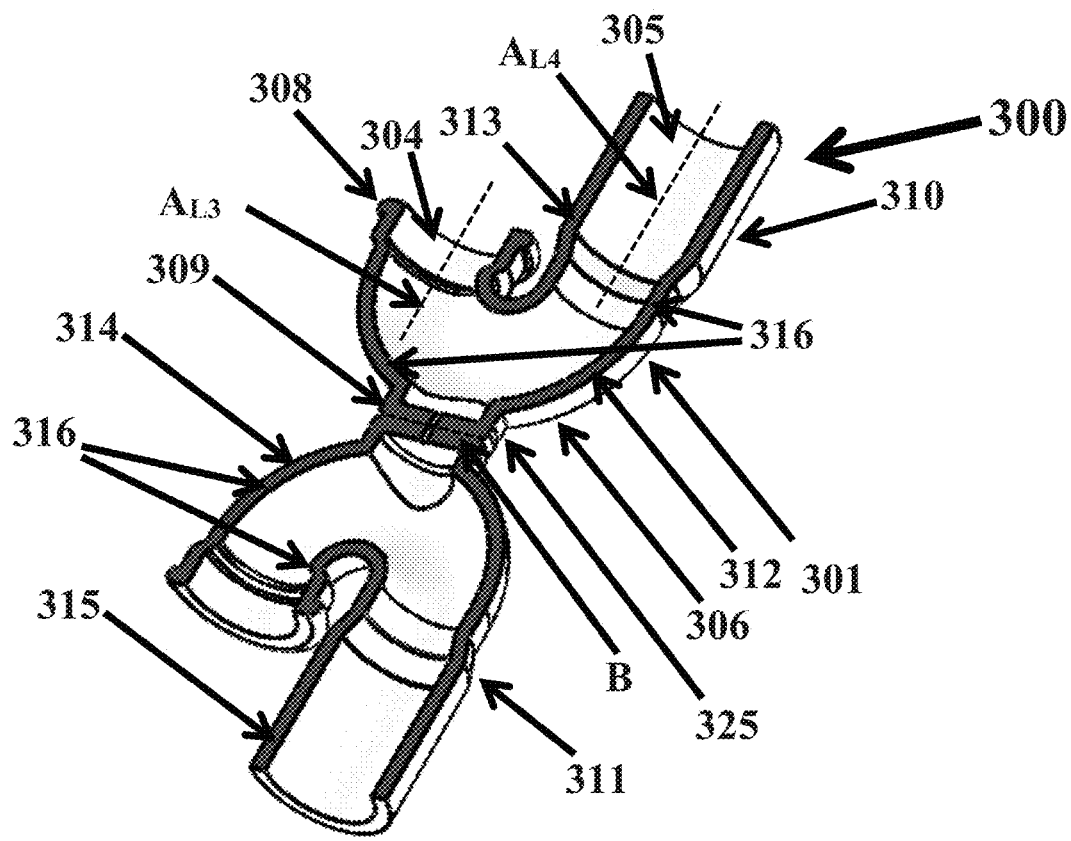
FIG. 4B is a perspective view of the J-shaped pipe insulating sleeve as shown in FIG. 4A, wherein the sleeve is in an open configuration.

With reference to FIG. 4A, which depicts a perspective view of the J-sleeve (300) in the closed configuration, the J-sleeve (300) generally defines a parabolically-shaped body (301) having a tubular (or rounded) outer surface (302) and an opposed interior surface (303) (see FIG. 4B) that is defined by the hollow interior portion of the J-sleeve (300). Similar to the J-shaped pipe section (112) received within the hollow interior portion of the J-sleeve (300), the parabolically-shaped body (301) of the J-sleeve (300) forms a shape similar to a letter "J." The body (301) of the J-sleeve (300) extends generally from a third end to a fourth end. The third and fourth ends define respective third and fourth openings (304, 305) that extend into the tubular body (301) of the J-sleeve (300) along respective third and fourth axes ($A_{L3}$, $A_{L4}$). As shown in FIG. 4B, the third and fourth axes are substantially parallel to one another. As further shown in FIGS. 4A and 4B, the third and fourth openings are in open communication with the hollow interior portion of the J-sleeve (300).

With continuing reference to FIGS. 4A-4C, the hollow parabolically-shaped body of the J-sleeve (300) includes a bottom-bent portion (306) disposed between the third and fourth axes and connecting the third and fourth ends together. At a bottom-most area of the bottom-bent portion (306), the J-sleeve (300) includes a tubular projection (325). When the J-sleeve (300) is disposed on the J-shaped pipe section (112) of the P-trap, the tubular projection (325) extends downwardly directly from the bottom-most portion of the J-shaped pipe section. Because the tubular projection (325) exists at the lowest point of the P-trap assembly when installed in accordance with a method of the invention, the tubular projection comprises a cleanout. The cleanout will accumulate and dispose of any water or moisture that is gravitationally directed along the outside of the pipe sections that are encased within the sleeves. As shown best in FIG. 4C, the cleanout has a flat, bottom surface that includes a small through bore. Therefore, when the J-sleeve (300) is in the closed configuration and the J-shaped pipe section (112) is disposed within the J-sleeve (300), water and/or moisture will be directed into the cleanout and out of the J-sleeve (300) via the through bore. The elimination of excess moisture from inside the J-sleeve (300) will discourage the growth of bacteria, mold, or mildew. However, as described in greater detail below with regard to the material properties of the sleeves of the present invention, the sleeves possess other antifungal and antibacterial properties which further discourage the buildup of mold and bacteria.

With reference now to FIG. 4C, the third end of the parabolically-shaped body (301) near the third opening (304) defines a second coupler (308), the second coupler (308) being characterized by a radially expanded (with respect to the third axis ($A_{L3}$)) or widened portion. The fourth end of the parabolically-shaped body near the fourth opening (305) defines a third coupler (307), the third coupler (307) being characterized by a radially expanded (with respect to the fourth axis) or widened portion. With continuing reference to FIG. 4C, the bottom bent portion (306) of the parabolically-shaped body (301), as well as portions of the third and fourth ends near the bent portion (306), has a substantially uniform diameter $D_2$ along its length. The second coupler has an expanded, variable diameter $D_{V2}$ along its length that is greater than $D_2$. As will be described in greater detail below, the second coupler is sized and configured to mate with a complementary coupler mechanism on another pipe insulating sleeve of the present invention. More particularly, the second coupler is configured to couple to (or otherwise be received by) the first coupler of the L-sleeve (200) so as to detachably connect the J-sleeve (300) to the L-sleeve (200).

With continuing reference to FIG. 4C, the parabolically-shaped body of the J-sleeve (300) includes a second hinged joint (309) adjacent the tubular outer surface (301) at the tubular projection (325). The second hinged joint bifurcates the parabolically-shaped body of the J-sleeve (300) into a first half and a second half (310, 311), the halves (310, 311) being hingedly connected at the second hinged joint (309) and rotatable relative to one another about an axis (B) defined by the second hinged joint (309).

The first half (310) defines fifth and sixth edges (312, 313) that are substantially planar with one another, where the fifth edge (312) extends from the second hinged joint (309) and the tubular outer surface (302) to the opposed interior surface (303), and where the sixth edge (313) extends from the tubular outer surface (302) to the opposed interior surface (309). The second half (311) defines seventh and eighth edges (314, 315) that are substantially planar with one another, where the seventh edge (314) extends from the second hinged joint (309) and the tubular outer surface (302) to the opposed interior surface (303), and where the eighth edge (315) extends from the tubular outer surface (302) to the opposed interior surface (303). The fifth and seventh edges (312, 314), which as noted above are partly connected to one another by the second hinged joint, define a second angle therebetween. It is noted that the sixth and eighth edges (313, 315) will abut one another only when the first and second halves of the parabolically-shaped body of the J-sleeve (300) are in the closed configuration.

The first half and second halves (310, 311) are substantially symmetrical with one another about a plane intersecting the second hinged joint (309) and intersecting the third and fourth axes ($A_{L3}$, $A_{L4}$) when the J-sleeve (300) is in the closed configuration. The first and second halves (310, 311) are distinguishable, however, in that they each carry a different set of complementary fastening mechanisms (316). As best shown in FIG. 4B, the first and second halves (310, 311) include complementary halves of a hook-and-loop fastening system, such as, for example Velcro® brand fasteners. When the first and second halves (310, 311) are fastened to one another by the fastening mechanisms (316), it will create a relatively streamlined, low-profile, and aesthetically appealing appearance of the outer surface (302) of the sleeve. It is understood that application of the fastening mechanism (316) when closing the J-sleeve (300) will provide an additional measure of retention to both keep the J-sleeve (300) closed and to further retain the pipe within the hollow interior of the J-sleeve (300). It is further understood that, in order to release the fastening mechanism (316), a user will need to apply sufficient force to separate the fastening mechanisms (316) and thereby open the J-sleeve (300) to adjust its positioning or to remove the pipe therefrom.

Figure 5A:
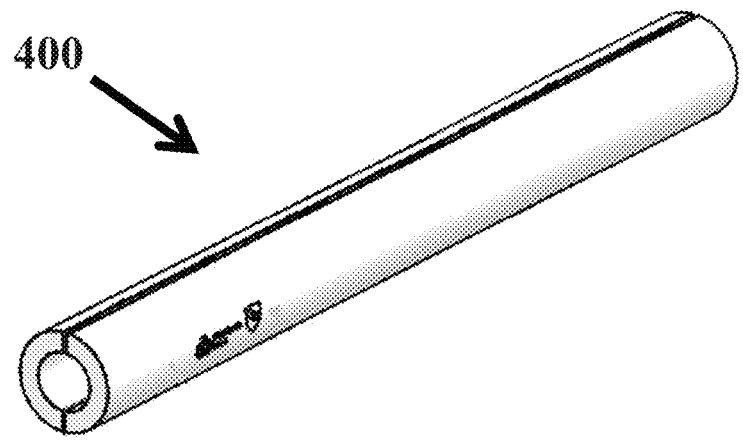
FIG. 5A is a perspective view of a supply line pipe insulating sleeve according to a first embodiment of the invention, wherein the sleeve is in a closed configuration.
Figure 5B:
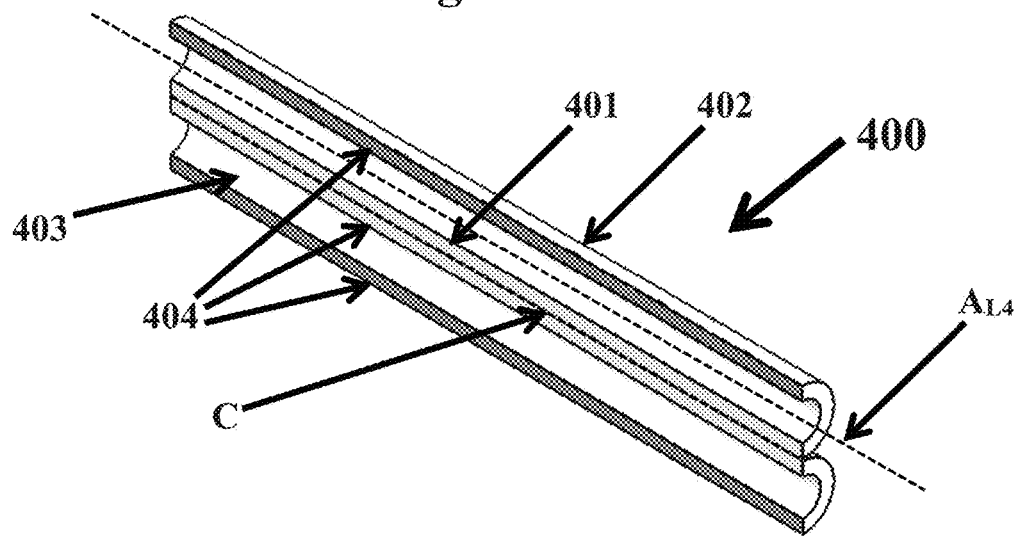
FIG. 5B is a perspective view of the supply line pipe insulating sleeve as shown in FIG. 5A, wherein the sleeve is in an open configuration.

With reference now to FIGS. 5A-5D, a supply line pipe insulating sleeve (400) is illustrated in various views. FIG. 5A illustrates a closed sleeve (supply pipe not shown for clarity), while FIG. 5B illustrates the same sleeve in an open configuration. As shown the supply line pipe insulating sleeve (400) may comprise a generally straight body (401) that is elongate along a central axis ($A_{L4}$). The supply line pipe insulating sleeve (400), like those described previously, has a hollow interior portion that is configured to receive the underlying supply pipe. Of course, one of skill in the art will readily appreciate that although the supply line pipe insulating sleeve (400) may be utilized for a supply pipe, its use is not so limited and it may alternatively be used for any other pipe that is desired to be insulated. Additionally, the supply line pipe insulating sleeve (400) may comprise other orientations that are not substantially elongate, as illustrated. Such other orientations may include a bent design, an angled design, or other similar orientations. Similar to the J-sleeve (300) and L-sleeve (200) described above, the supply line pipe insulating sleeve (400) may be coupled to other adjoining pipe insulating sleeves in series with it as part of a larger system (see, e.g., FIGS. 2A-2D).

Figure 5C:
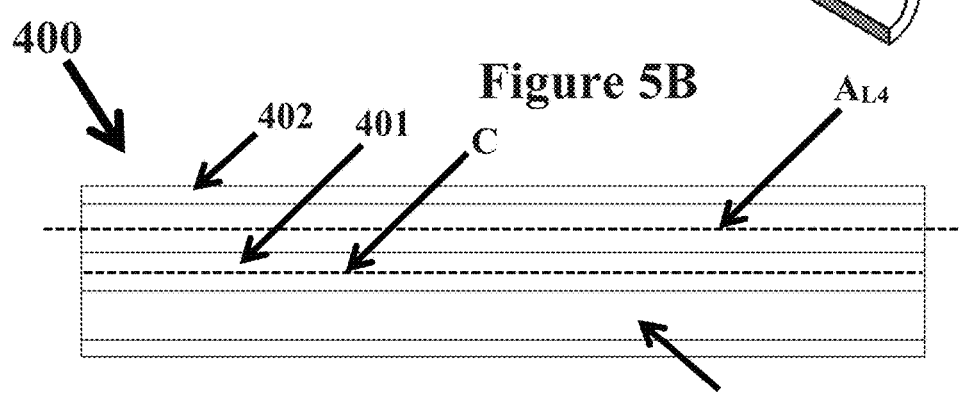
FIG. 5C is a front-plan view of the supply line pipe insulating sleeve as shown in FIG. 5B.
Figure 5D:
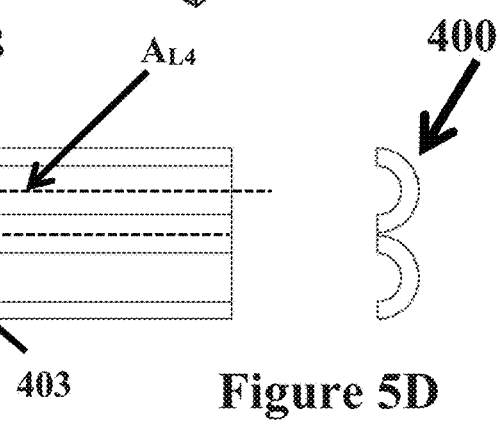
FIG. 5D is a side-plan view of the supply line pipe insulating sleeve as shown in FIG. 5C.

As illustrated particularly in FIGS. 5B-5D, the supply line pipe insulating sleeve (400), like those previously described herein, is capable of opening up to (and beyond) 180° about an axis defined by a hinge (401). Such large degree of opening is advantageous to easily and conveniently accommodate a pipe within the sleeve without needing to manually split (or otherwise open) the sleeve. Like the previously-described sleeves, the supply pipe insulating sleeve (400) consists of first and second halves (402, 403) that are generally bifurcated by the hinge (401) separating them. As mentioned previously, the halves (402, 403) of the supply line pipe insulating sleeve (400) are capable of rotation about an axis (C) defined by that hinge. Further, and as shown in FIG. 5B, the halves (402, 403) may each be fitted with a fastening mechanism (404), such as a hook-and-loop system as previously described, to facilitate retaining the supply pipe insulating sleeve in a closed configuration. Once the sleeve is closed and retained by the fastening mechanism (404), in order to open the sleeve for removal or adjustment, the user will need to apply sufficient force to overcome the retaining force of the fastening mechanisms (404).

Figure 6A:
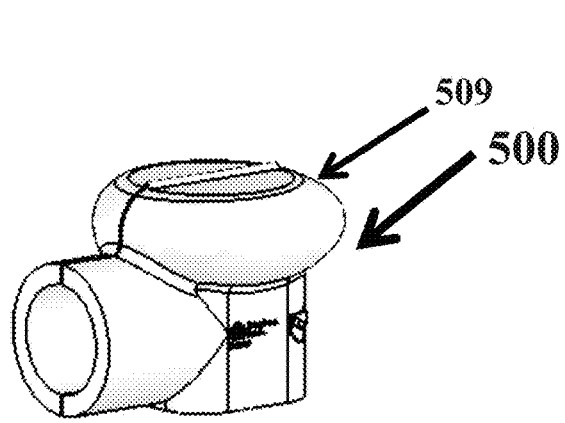
FIG. 6A is a perspective view of a supply stop pipe insulating sleeve according to a first embodiment of the invention, wherein the sleeve is in a closed configuration.
Figure 6B:
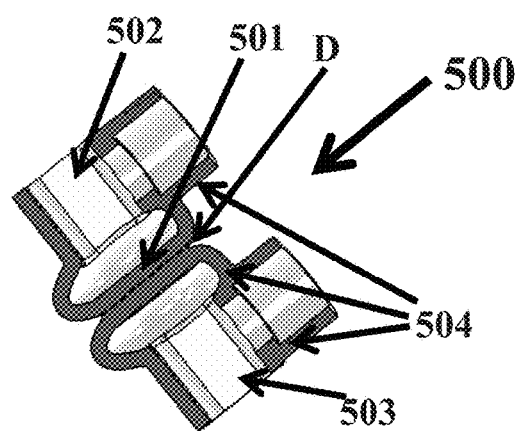
FIG. 6B is a perspective view of the supply stop pipe insulating sleeve as shown in FIG. 6A, wherein the sleeve is in an open configuration

With reference now to FIGS. 6A-6D, a supply stop pipe insulating sleeve (500) is illustrated in various views. FIG. 6A illustrates a closed sleeve (supply stop not shown for clarity), while FIG. 6B illustrates the same sleeve in an open configuration. As shown the supply stop pipe insulating sleeve (500) may comprise a short body that terminates in a closed portion (509). The supply stop pipe insulating sleeve (500), like those described previously, has a hollow interior portion that is configured to receive the underlying supply stop. The supply stop pipe insulating sleeve (500) may comprise other orientations and sizes not exactly as shown, so it should be understood that the embodiment is only illustrative. Similar to the J-sleeve (300) and L-sleeve (200) described above, the supply stop pipe insulating sleeve (500) may be coupled to other adjoining pipe insulating sleeves in series with it as part of a larger system (see, e.g., FIGS. 2A-2D). Particularly, it is contemplated that the supply stop pipe insulating sleeve (500) will be coupled to the supply stop pipe insulating sleeve (400) (see FIGS. 5A-5D) to insulate, together, a larger portion of the supply piping underneath the sink.

Figure 6C:
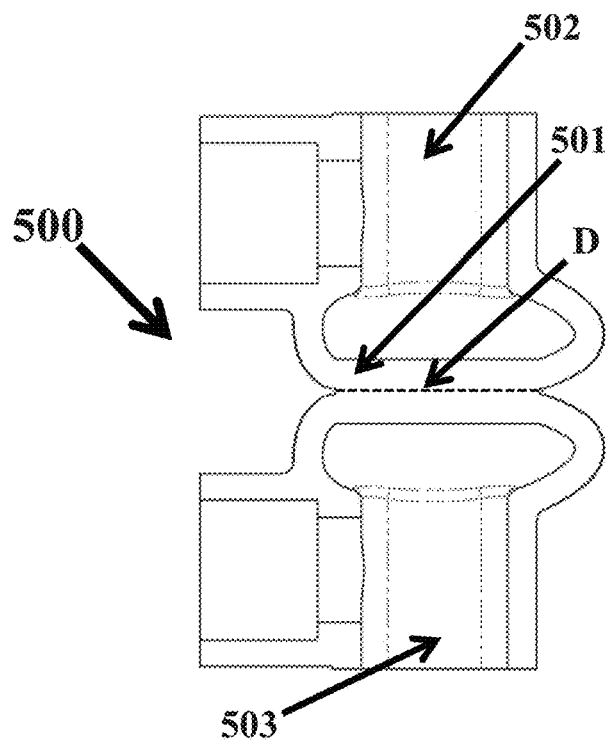
FIG. 6C is a front-plan view of the supply stop pipe insulating sleeve as shown in FIG. 6A, wherein the sleeve is in an open configuration.
Figure 6D:
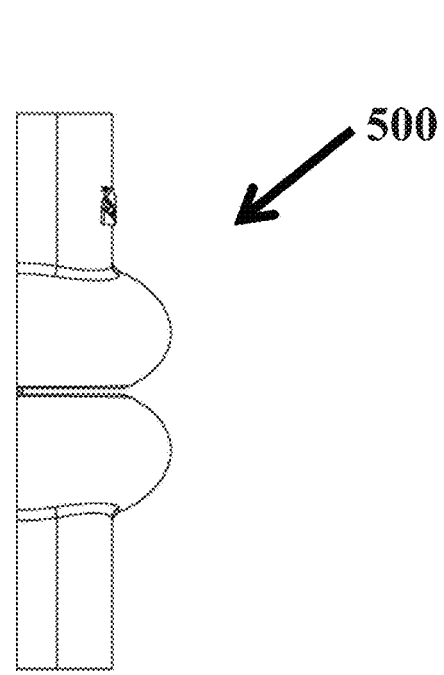
FIG. 6D is a side-plan view of the supply stop pipe insulating sleeve as shown in FIG. 6C.

As illustrated particularly in FIGS. 6B-6D, the supply stop pipe insulating sleeve (500), like those previously described herein, is capable of opening up to (and beyond) 180° about an axis (D) defined by a hinge (501) at the closed portion (509). Such large degree of opening is advantageous to easily and conveniently accommodate a pipe within the sleeve without needing to manually split (or otherwise open) the sleeve. Like the previously-described sleeves, the supply stop pipe insulating sleeve (500) consists of first and second halves (502, 503) that are generally bifurcated by the hinge (501) separating them. As mentioned previously, the halves (502, 503) of the supply stop pipe insulating sleeve (500) are capable of rotation about the axis (D) defined by that hinge (501). Further, and as shown in FIG. 6B, the halves (502, 503) may each be fitted with a fastening mechanism (504), such as a hook-and-loop system as previously described, to facilitate retaining the supply pipe insulating sleeve in a closed configuration. Once the sleeve is closed and retained by the fastening mechanism (504), in order to open the sleeve for removal or adjustment, the user will need to apply sufficient force to overcome the retaining force of the fastening mechanisms (504).

Figure 7A:
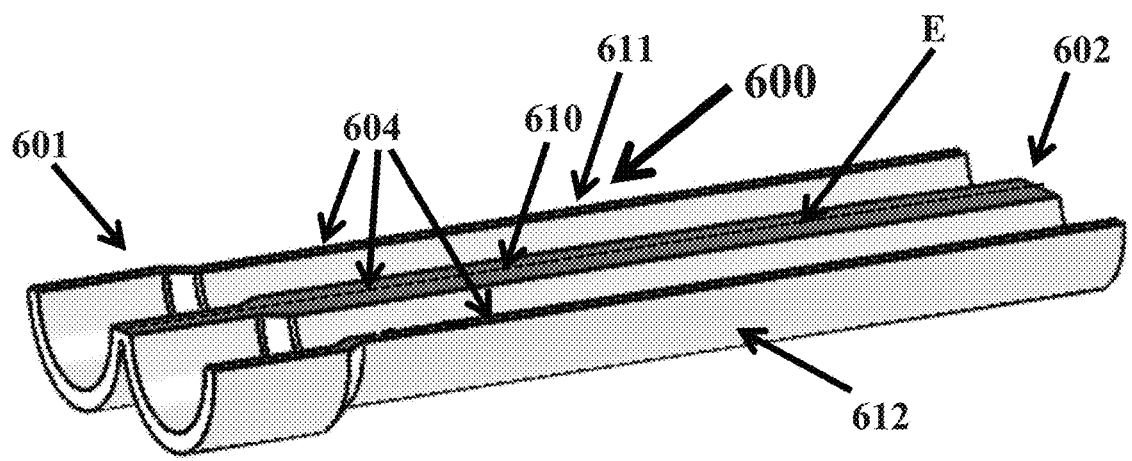
FIG. 7A is a perspective view of an extension tube pipe insulating sleeve according to a first embodiment of the invention, wherein the sleeve is in an open configuration.
Figures 7B, 7C:
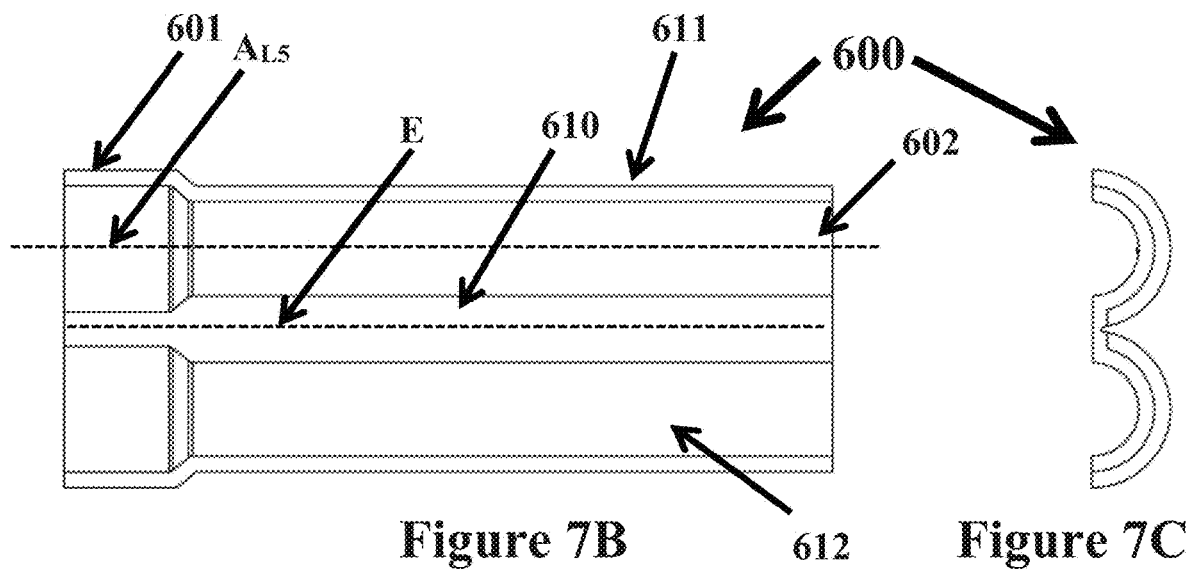
FIG. 7B is a front-plan view of the extension tube pipe insulating sleeve as shown in FIG. 7A.
FIG. 7C is a side-plan view of the extension tube pipe insulating sleeve as shown in FIG. 7B.

With reference now to FIGS. 7A-7C, an extension tube pipe insulating sleeve (600) is illustrated in various views. FIG. 7A illustrates an open sleeve (extension tube pipe not shown for clarity). As shown the extension tube pipe insulating sleeve (600) may comprise a generally straight body elongate along a central axis ($A_{L5}$). It is understood that the extension tube pipe insulating sleeve (600) may comprise other orientations and sizes not exactly as shown, so it should be understood that the embodiment is only illustrative.

The extension tube pipe insulating sleeve (600), like those described previously, has a hollow interior portion that is configured to receive the underlying extension tube pipe. As shown a first end (601) of the sleeve has a generally larger diameter than an opposed second end (602) along the central axis ($A_{L5}$). As illustrated, the hollow interior portion at the first end (601) of the extension tube pipe insulating sleeve (600) has an internal diameter that is substantially equivalent to an outer diameter of the extension tube pipe insulating sleeve at the second end (602). This similarity of these inner and outer diameters enables multiple extension tube pipe insulating sleeves (600) to be coupled to one another in series along a respective series of underlying pipes, whereby the first end (601) of a first extension tube pipe insulating sleeve (600) will receive an equivalent second end (602) of a second extension tube pipe insulating sleeve (600). As one of skill in the art will appreciate, multiple extension tube pipe insulating sleeves (600) may be connected to one another using this process. However, the extension tube pipe insulating sleeve (600) is not so limited to coupling only to other extension tube pipe insulating sleeves (600) and may alternatively couple to other pipe insulating sleeves that are part of the system of pipe insulating sleeves, as shown and described herein.

As illustrated particularly in FIGS. 7B-7C, the extension tube pipe insulating sleeve (600), like those previously described herein, is capable of opening up to (and beyond) 180° about an axis defined by a hinge (610) at the closed portion. Such large degree of opening is advantageous to easily and conveniently accommodate a pipe within the sleeve without needing to manually split (or otherwise open) the sleeve. Like the previously-described sleeves, the extension tube pipe insulating sleeve (600) consists of first and second halves (611, 612) that are generally bifurcated by the hinge (610) separating them. As mentioned previously, the halves (611, 612) of the extension tube pipe insulating sleeve (600) are capable of rotation about the axis (E) defined by that hinge (610). Further, and as shown in FIG. 7B, the halves (611, 612) may each be fitted with a fastening mechanism (604), such as a hook-and-loop system as previously described, to facilitate retaining the extension tube pipe insulating sleeve (600) in a closed configuration. Once the sleeve is closed and retained by the fastening mechanism (604), in order to open the sleeve for removal or adjustment, the user will need to apply sufficient force to overcome the retaining force of the fastening mechanisms (604).

Figure 8:
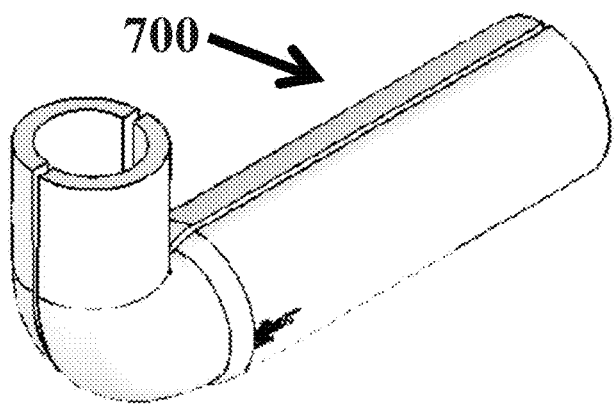
FIG. 8 is a perspective view of a grid drain offset pipe insulating sleeve, wherein the sleeve is in a closed configuration.
Figure 9:
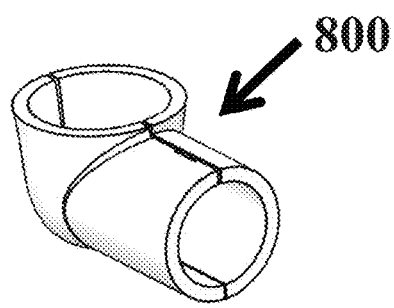
FIG. 9 is a perspective view of an elbow pipe insulating sleeve, wherein the sleeve is in a closed configuration.
Figure 10:
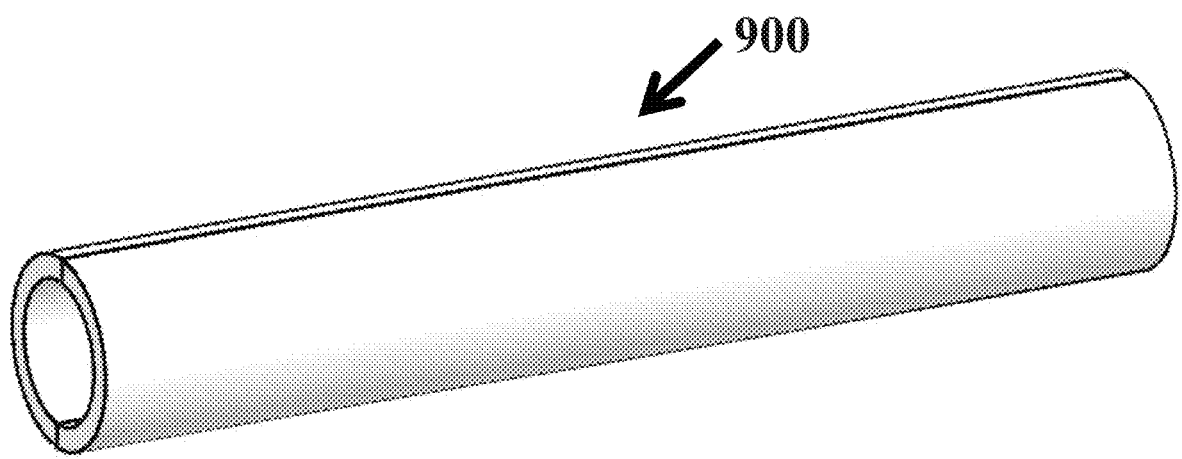
FIG. 10 is a perspective view of a grid drain pipe insulating sleeve, wherein the sleeve is in a closed configuration.

With reference now to FIGS. 8-10, embodiments of other additional pipe insulating sleeves are illustrated, which may be included in the system of pipe insulating sleeves described herein. FIG. 8 illustrates a grid drain offset pipe insulating sleeve (700), FIG. 9 illustrates an elbow pipe insulating sleeve (800), and FIG. 10 illustrates a grid drain pipe (900). These pipe insulating sleeves, though shown in closed configurations in each of FIGS. 8-10 share the same features as the other pipe insulating sleeves described herein. Namely, each of the sleeves of FIGS. 8-10 is additionally capable of opening up to and beyond 180° about a hinge axis on a hinge of each sleeve (not illustrated). Further, each sleeve of FIGS. 8-10 may include a fastening mechanism at an outer portion of the sleeves to retain each sleeve in a respective closed position.

In particular, the grid drain offset pipe insulating sleeve (700) of FIG. 8 has a non-constant diameter along its length, as well as a 90° bend in a body of the grid drain offset pipe insulating sleeve (although other degrees of bending, or no bending are contemplated). The non-constant diameter results in a first, large diameter at a first end of the body and a second, smaller diameter at a second opposing end of the body. This difference in diameter functions as a coupler and will permit the grid drain offset pipe insulating sleeve to couple to other pipe insulating sleeves having complementary couplers (or similar diameters at respective end portions) so as to mate therewith.

The pipe insulating sleeves as presently described will advantageously possess anti-fungal and anti-bacterial properties that make them well-suited for undersink piping, which is particularly known to build up moisture. However, as previously described, the pipe insulating sleeves are not so-limited to undersink piping and can also be used in other types of piping where insulation is desired and where mold or bacteria may otherwise accumulate from excess moisture.

The anti-fungal and anti-bacterial properties of the present pipe-insulating sleeves are provided, in large part, by the materials from which the sleeves are constructed. In a first aspect, the pipe insulating sleeves are constructed of an elastomeric foam material. Importantly, the foam material itself comprises antifungal and antibacterial components. In other words, the antifungal and antibacterial aspects are dispersed throughout the foam material prior to being molded into the desired shape of the sleeve. This is an advantage over known sleeves in the art which utilize a coating on the outermost surfaces of the sleeve. Such alternatives are inferior to the presently disclosed material arrangement of elastomeric foam because the coating may wear away over time or become compromised due to trauma to the sleeves. When the coating of existing systems has become compromised, those compromised portions are greatly susceptible to the growth of bacteria and/or mold. Because the antifungal and antibacterial components are dispersed throughout the elastomeric foam material, the sleeves of the present disclosure are protected both inside and out from the growth of bacteria and/or mold.

An elastomeric foam material is ideally suited for the pipe insulating sleeves of the present invention. In one respect, the foam material may be compressed slightly on itself, which provides a certain softness that will minimize forceful impact by the user with the sleeves as they surround the pipes. Furthermore, the elastomeric foam material is smooth and uniform along its length, and any nicks or imperfections in the surface caused by trauma or forceful contact with the sleeves will not create puncture risks for a user that forcefully comes into contact with these nicks or imperfections. This represents an improvement over existing polyvinylchloride (PVC) or similarly suited hard materials. Importantly, the elastomeric foam material has heat insulating properties that make it ideal for inclusion in the material of a pipe insulating sleeve. The elastomeric foam material will insulate the underlying pipes by keeping heat from escaping through the sleeve and to the external environment. The end result is that the underlying pipe will retain its heat and lose less energy to the environment thereby increasing efficiency and saving costs (either relating to heating water through supply lines or costs of HVAC for heat undesirably transferred to the ambient air) and also that a user will not be scalded by coming into contact with a pipe insulating sleeve containing an underlying pipe. The elastomeric material may be made from a synthetic elastomeric material such as polyurethane, polyvinyl chloride, or silicon rubber, so as to provide the desired resiliency for facile installation as well as a suitable thermal conductivity value, good cushioning effects, and other desired properties. The material preferably has a foamed structure and any desired coloration. A particularly preferred elastomeric material is ethylene-vinyl-acetate (EVA).

A method of installing a pipe insulating sleeve system according to an embodiment generally comprises installing individual pipe insulating sleeves on the various undersink pipes. The method is not limited to installing the sleeves in series with one another (i.e., by removably connecting them to one another at their respective ends), as one of ordinarily skill in the art will appreciate that the sleeves may be installed individually. However, in order to comply with the requirements of the ADA, a user may be required to completely insulate a series of piping within a certain distance of the edge of the sink. Accordingly, the disclosed exemplary method will relate to installing the pipe insulating sleeves on a set of undersink pipes in a series.

The method of installing a pipe insulating sleeve system on an undersink pipe will ordinarily start by identifying an undersink pipe to be insulated by a pipe insulating sleeve. A user is not required to necessarily start the method with any particular undersink pipe, and the user is generally free to choose a first undersink pipe to insulate.

Next, a user will select a pipe insulating sleeve that is sized and configured to be installed on the identified undersink pipe. As described above, the pipe insulating sleeve is ordinarily elongate along a first axis.

In another step, the user opens the pipe insulating sleeve by rotating a first half of a body of the pipe insulating sleeve relative to a second half of the body about a second axis defined by a hinged joint that bifurcates the first half from the second half. A person having ordinary skill in the art will appreciate that opening the pipe insulating sleeve creates a gap at an outer edge of the pipe insulating sleeve on the opposite side of first axis from the hinged joint. This size of the gap is a function of the degree of rotation of the first half relative to the second half about the second axis. The larger the degree of rotation, the larger the gap will be and hence the easier it will be to pass a pipe through the gap and into a hollow interior of the pipe insulating sleeve. Importantly, the pipe insulating sleeve is capable of a large degree of rotation (approaching and surpassing 180° of rotation) which will greatly simplify passing the undersink pipe through the gap.

In a further step, the user will retain the identified undersink pipe within the hollow interior portion of the pipe insulating sleeve by passing the identified pipe through the gap along a direction generally perpendicular to the first axis of the pipe insulating sleeve. The identified undersink pipe will be fully inserted through the gap and will be captured within the hollow interior of the pipe insulating sleeve. As described in greater detail above, the hollow interior portion of the pipe insulating sleeve is sized and configured to mate with the outer surface of the undersink pipe. In other words, the inner diameter of the pipe insulating sleeve will closely match the outer diameter of the identified undersink pipe. However, one of skill in the art will appreciate that the inner diameter of the pipe insulating sleeve may be slightly larger so as to interpose a small layer of air between the pipe insulating sleeve and the identified undersink pipe. This small layer of air may be advantageous in providing further heat insulating property by minimizing heat transfer otherwise accomplished by the direct contact between the undersink pipe and the pipe insulating sleeve.

In a further method step, the user will close the pipe insulating sleeve by rotating the first half relative to the second half in the opposite direction as in the opening step so as to capture the identified undersink pipe within the pipe insulating sleeve and thereby close the gap. As described in greater detail above, the outer edge adjacent the gap may comprise two edges that abut one another when the pipe insulating sleeve has been closed. To retain the pipe insulating sleeve in the closed configuration, each one of the two edges may be equipped with a complementary fastening mechanism to the other, opposing edge. The fastening mechanism may comprise Velcro® brand fasteners, or other hook-and-loop design. In other embodiments described herein, the fastening mechanism may comprise magnetic closure devices having high magnetic field strength.

In an additional step, the user may adjust the positioning of the pipe insulating sleeve. The adjusting may be accomplished by shifting the pipe insulating sleeve about the identified undersink pipe by translating the pipe insulating sleeve along the first axis. The adjusting may also be accomplished by rotating the pipe insulating sleeve about the first axis. In another respect, the adjusting may be accomplished by removing the pipe insulating sleeve and re-installing it on the identified undersink pipe or on a different undersink pipe than the identified undersink pipe.

In an additional step, the user may remove the pipe insulating sleeve from the identified undersink pipe. The removal may be accomplished by opening the pipe insulating sleeve by rotating the first half of the body relative to the second half of the body along the second axis defined by the hinge. The opening must be performed with sufficient force to disengage the fastening mechanisms on the two abutting edges of the pipe insulating sleeve. Once the fastening mechanisms have been disengaged, the pipe insulating sleeve may be separated from the identified undersink pipe by removing the undersink pipe through the gap.

The method of installing the present system may be further expanded by performing the installation steps using other pipe insulating sleeves. In other words, the pipe insulating sleeve as described above would represent a first pipe insulating sleeve in the system, and the method of installing would further include installing a second pipe insulating sleeve on a different undersink pipe than the identified pipe insulating sleeve. As described above, it may be advantageous or desired for the different undersink pipe to be immediately adjacent and connected to the identified undersink pipe, although that proximity is not required.

The method may further include installing additional pipe insulating sleeves (e.g., third, fourth, fifth, sixth, etc.) on additionally different undersink pipes than the different undersink pipe and then the identified undersink pipe. It may be desired in a given application to install a pipe insulating sleeve on each and every exposed undersink pipe, and indeed, the method may include installing sufficient pipe insulating sleeves to cover each of such undersink pipes.

For the sake of brevity, the method of installing the second, third, etc. pipe insulating sleeves is sufficiently similar to the method of installing the first pipe insulating sleeve as described above. Therefore, one of skill in the art will understand that the installation of, adjustment of, and removal of the second, third, etc. pipe insulating sleeves may be accomplished in a similar manner.

One notable difference, however, of installing the second, third, etc. pipe insulating sleeves may arise if the second, third, etc. pipe insulating sleeve is to be installed immediately adjacent to a previously installed pipe insulating sleeve. In such an instance, a user may desire to removably connect, couple, or attach the second, third, etc. pipe insulating sleeve to the previously installed pipe insulating sleeve. As described in greater detail above, the user may mate the coupler of the second, third, etc. pipe insulating sleeve with the corresponding coupler of the previously installed pipe insulating sleeve. Mating the respective couplers may be accomplished by, for example, overlaying a portion of the second, third, etc. pipe insulating sleeve with the previously installed pipe insulating sleeve (or vice versa), however other coupling mechanisms and methods of coupling are contemplated, such as (by way of non-limiting example) using adhesives, glues, tabs, screws, or other coupling mechanisms known in the art. It will be understood that coupling adjacent pipe insulating sleeves to one another will create a seal between the coupled pipe insulating sleeves.

Although the foregoing description relates primarily to the use of the pipe insulating sleeves of the present invention in undersink piping applications, it will be understood by one of ordinary skill in the art that the invention is not so-limited. For instance, it is contemplated that the presently disclosed pipe insulating sleeves may be utilized to cover any piping, regardless of location or the fluid contained therein, where insulation may be desired. As described above, such usage will advantageously provide thermal insulation to the fluid being transported through the piping by preventing internal heat from transferring into the ambient environment. Furthermore, such insulation may provide protection for equipment or the like immediately adjacent the piping, which would adversely be affected by heat.

What is claimed is:

1. A system for insulating pipes, the system comprising:
a first sleeve defining a hollow first body that extends along a first axis of elongation from a first end to a second end, the first body having a first rounded outer surface and an opposed first inner surface,
wherein the first body includes a first hinge that extends along a portion of the first outer surface of the first body, the first hinge is configured free of a biasing force, the first hinge bifurcating the first body into a first half and a second half, the first half of the first body defining first and second edges that are planar and the second half of the first body defining third and fourth edges that are planar, the first and third edges being connected by the first hinge and defining a first angle therebetween,
wherein the second edge defines a first at least one pit configured to receive a first at least one fastening element within, and the fourth edge defines a second at least one pit configured to receive a second at least one fastening element within, the second at least one fastening element corresponding to the first at least one fastening element,
wherein the first and second halves of the first body are rotatable relative to one another about a first rotation axis defined by the first hinge, such that the first sleeve defines:
A) a closed configuration wherein the second and fourth edges abut one another causing the first at least one fastening element to engage the second at least one fastening element, and
B) a partially open configuration wherein the second and fourth edges do not abut one another and the first angle is between 0° and 180°.

2. The system of claim 1, further comprising:
a second sleeve configured to removably connect to the first sleeve, the second sleeve defining a hollow second body that extends along a second axis of elongation from a third end to a fourth end, the second body having a second outer surface and an opposed second inner surface, the third end defining a third opening and the fourth end defining a fourth opening,
wherein second body includes a second hinge that extends along a portion of the second outer surface at the fourth end, the second hinge bifurcating the second body into a first half and a second half, the first half of the second body defining fifth and sixth edges that are planar and the second half of the second body defining seventh and eighth edges that are planar, the fifth and seventh edges being connected by the second hinge and defining a second angle therebetween,
the first and second halves of the second body being rotatable relative to one another about a first rotation axis defined by the first hinge, such that the second sleeve defines:
A) a closed configuration wherein the sixth and eighth edges abut one another,
B) a partially open configuration wherein the sixth and eighth edges do not abut one another and the second angle is between 0° and 180°.

3. The system of claim 2, wherein:
the first sleeve further defines a fully open configuration wherein the second and fourth edges do not abut one another and the first angle is greater than 180°, and the second sleeve further defines a fully open configuration wherein the sixth and eighth edges do not abut one another and the second angle is greater than 180°.

4. The system of claim 2, wherein the second end of the first sleeve defines a first coupler and the third end of the second sleeve defines a second coupler, wherein the first coupler is configured to complementarily engage the second coupler so as to removably connect the first sleeve to the second sleeve.

5. The system of claim 4, wherein when the first sleeve is detachably coupled to the second sleeve, the second outer surface of the second sleeve at the third end abuts the first inner surface of the first sleeve at the second end.

6. The system of claim 2, wherein the sixth edge includes a third at least one fastening element, and the eighth edge includes a fourth at least one fastening element corresponding to the third at least one fastening element, wherein each of the third and fourth at least one fastening element is sized and configured to selectively retain the second sleeve in its respective closed configuration.

7. The system of claim 2, wherein:
the first sleeve comprises an L-shaped sleeve, configured to receive an L-shaped pipe section of a P-trap, and
the second sleeve comprises a J-shaped sleeve, configured to receive a J-shaped pipe section of a P-trap.

8. The system of claim 2, wherein the first body comprises a tubular body that resembles an elongated letter L, and wherein the second body comprises a parabolically-shaped body that resembles the letter J.

9. The system of claim 2, wherein a first opening extends into the first body along a first axis, a second opening extends into the first body along a second axis that is perpendicular to the first axis, the third opening extends into the second body along a third axis, and the fourth opening extends into the second body along a fourth axis that is parallel to the third axis.

10. The system of claim 2, wherein the first and second sleeves comprise an elastomeric foam material.

11. The system of claim 10, wherein the elastomeric foam material comprises ethylene-vinyl acetate, antifungal and antimicrobial ingredients, or combinations thereof.

12. The system of claim 2, further comprising a third sleeve that is removably connectable to any of the first and second sleeves.

13. The system of claim 12, wherein the third sleeve is configured to receive any one of: a supply line pipe, a supply stop pipe, an extension tube pipe, a grid drain offset pipe, an elbow pipe, and a grid drain pipe.

14. The system of claim 1, wherein the first at least one fastening element comprises a first at least one magnet, and wherein the second at least one fastening element comprises a second at least one magnet.

15. A method of installing a pipe insulating sleeve system on an undersink pipe, the method comprising the steps of:
selecting a pipe insulating sleeve that is sized and configured to be installed on an identified undersink pipe, the pipe insulating sleeve being generally elongate along a first axis;
opening the pipe insulating sleeve by rotating a first half of a body of the pipe insulating sleeve relative to a second half of the body about a second axis defined by a hinged joint that bifurcates the first half from the second half, the first half defining a first edge that is planar and the second half defining a second edge that is planar, the first edge defining a first at least one pit configured to receive a first at least one fastening element and the second edge defining a second at least one pit configured to receive a second at least one fastening element within, the second at least one fastening element corresponding to the first at least one fastening element, the hinged joint is configured free of a biasing force, wherein opening the pipe insulating sleeve creates a gap defined by the first and second edges of the pipe insulating sleeve on the opposite side of first axis from the hinged joint, wherein the gap is a function of a degree of rotation between the first and second halves of the body of the pipe insulating sleeve, and wherein the degree of rotation is configured to exceed 180°;

retaining the identified undersink pipe within a hollow interior portion of the pipe insulating sleeve by inserting the identified undersink pipe through the gap; and closing the pipe insulating sleeve by rotating the first half relative to the second half in the opposite direction as in the opening step so as to abut the first edge against the second edge causing the first at least one fastening element to engage the second at least one fastening element enclosing the identified undersink pipe within the pipe insulating sleeve.

16. The system of claim 1, wherein the first inner surface is engageable with the pipe, and wherein the first and second edges extend between the first and second ends of the first sleeve from the first outer surface to the first inner surface, and wherein the third and fourth edges extend between the first and second ends of the first sleeve from the first outer surface to the first inner surface.

17. The method of claim 15, wherein the first at least one fastening element comprises a first at least one magnet, and wherein the second at least one fastening element comprises a second at least one magnet.

18. The method of claim 15, further comprising the step of:

adjusting the positioning of the pipe insulating sleeve by any one of rotating or translating the pipe insulating sleeve about or along the first axis relative to the identified undersink pipe.

19. The method of claim 15, the method further comprising the step of:

removing the pipe insulating sleeve from the undersink pipe by rotating the first half of the pipe insulating sleeve body relative to the second half along the same direction of rotation as in the opening step, wherein the removing step is performed with sufficient force to cause the fastening mechanisms to unfasten and form a gap sufficiently large so as to pass the undersink pipe outwardly from the hollow interior portion of the pipe insulating sleeve.

20. The method of claim 15, the method further comprising the steps of:

installing an additional pipe insulating sleeve on a different undersink pipe than the identified undersink pipe, whereby the additional pipe insulating sleeve is installed adjacent to the pipe insulating sleeve; and coupling the additional pipe insulating sleeve to the pipe insulating sleeve.

* * * * *